3,080,764
MULTIPLE SPEED POWER TRANSMISSION MECHANISM
Raymond J. Miller, Detroit, and Robert L. Erwin and Donald R. King, Birmingham, Mich., assignors to Ford Motor Company, Dearborn, Mich., a corporation of Delaware
Filed Apr. 2, 1958, Ser. No. 725,967
26 Claims. (Cl. 74—15.84)

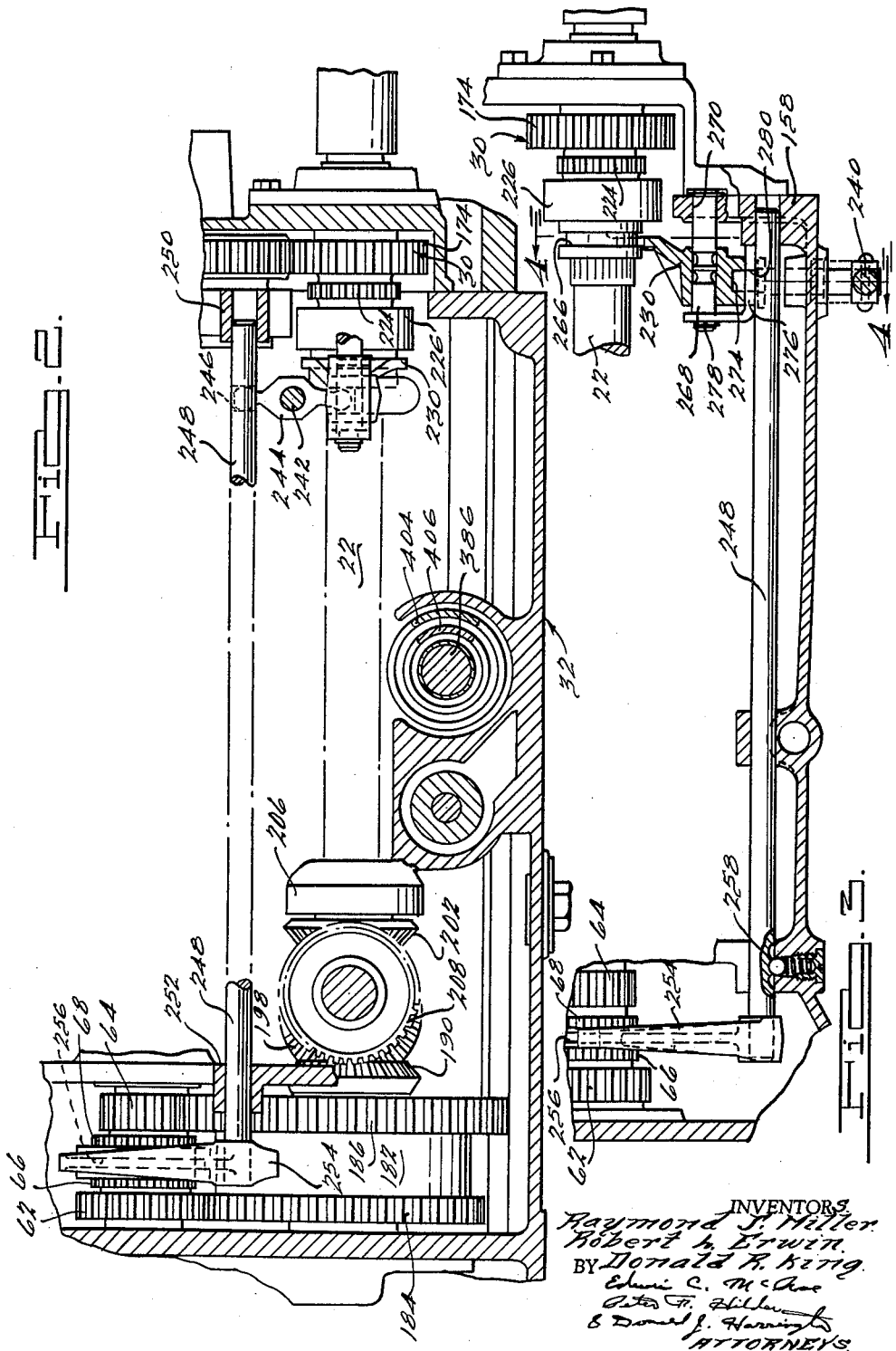

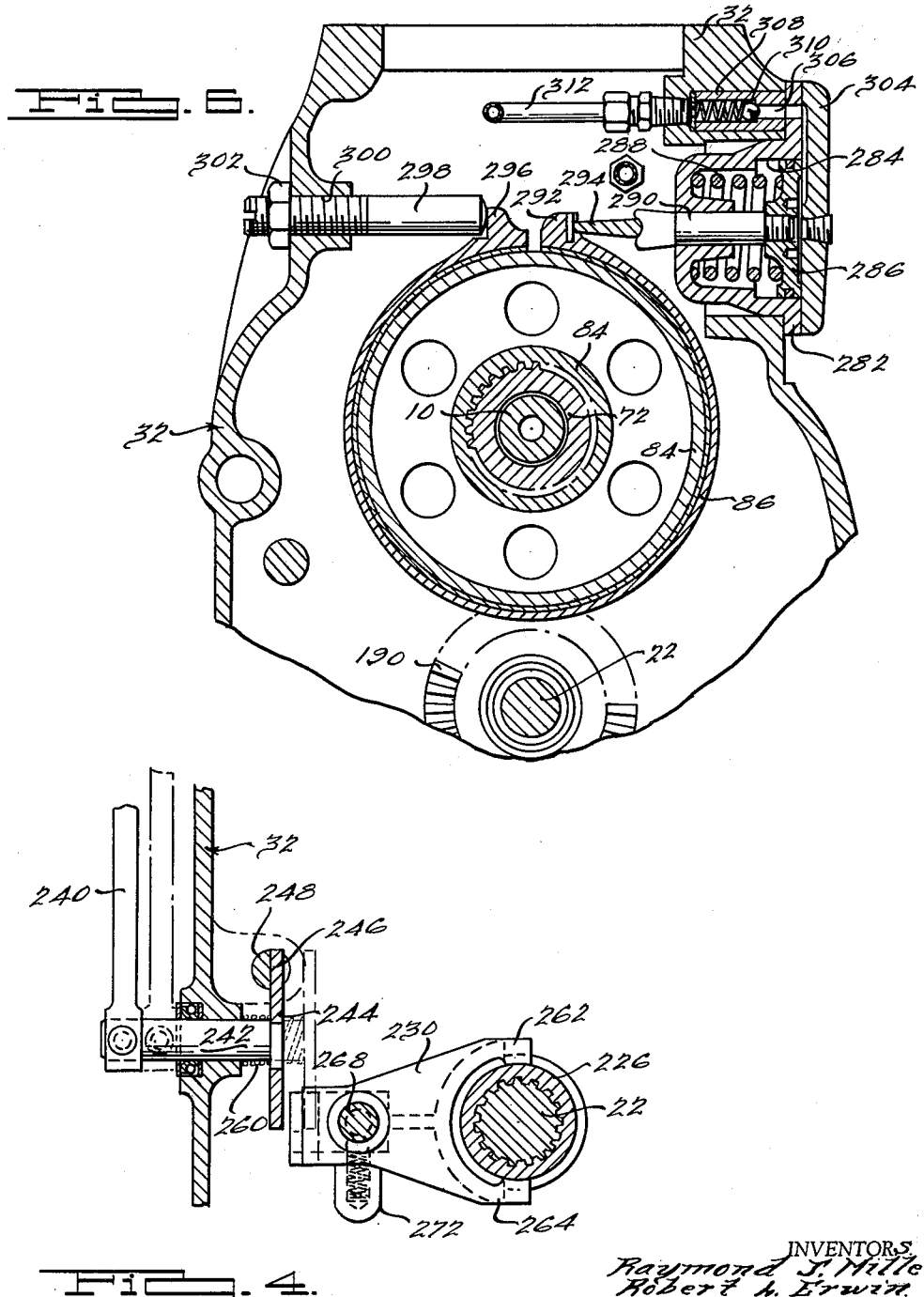

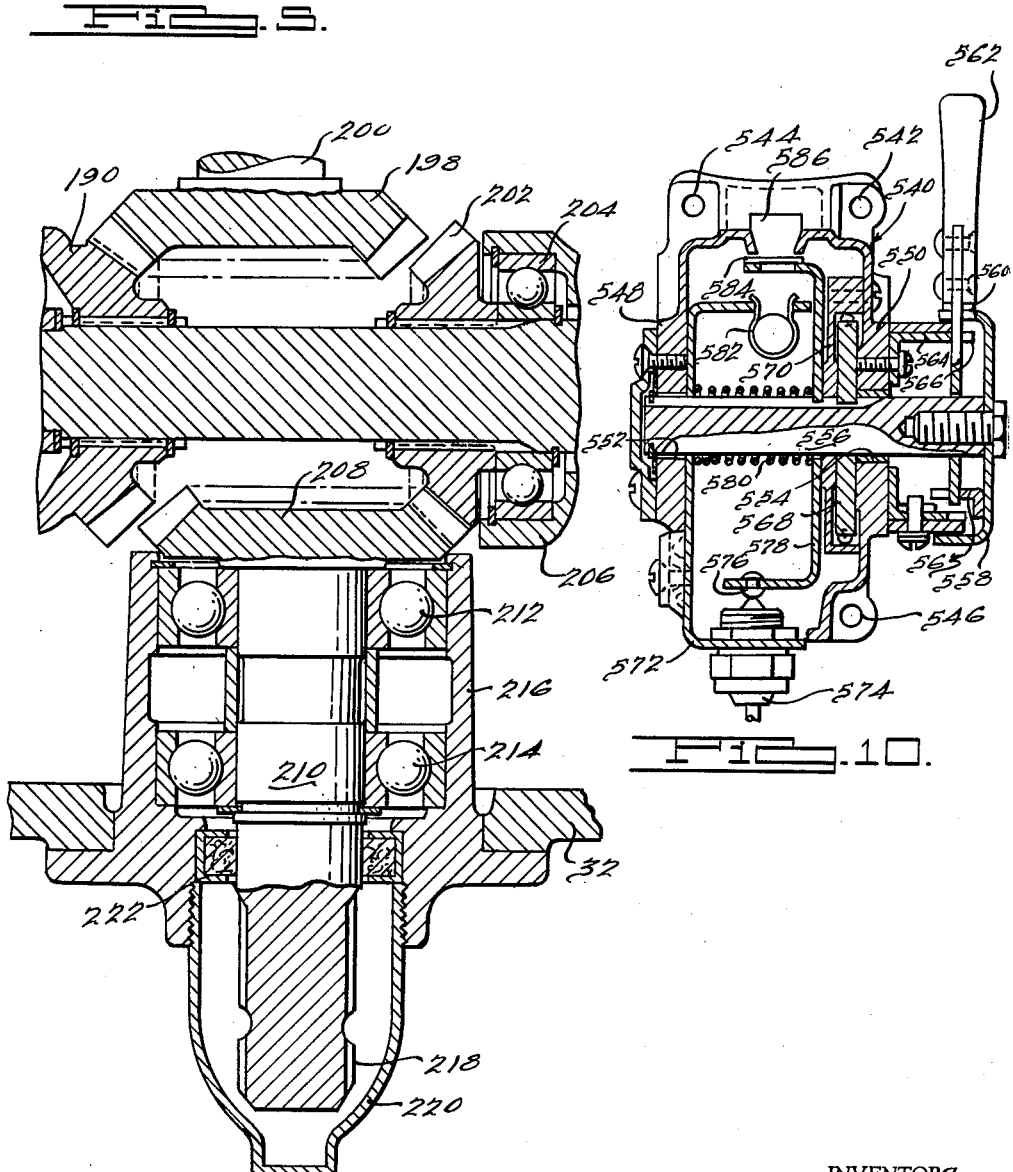

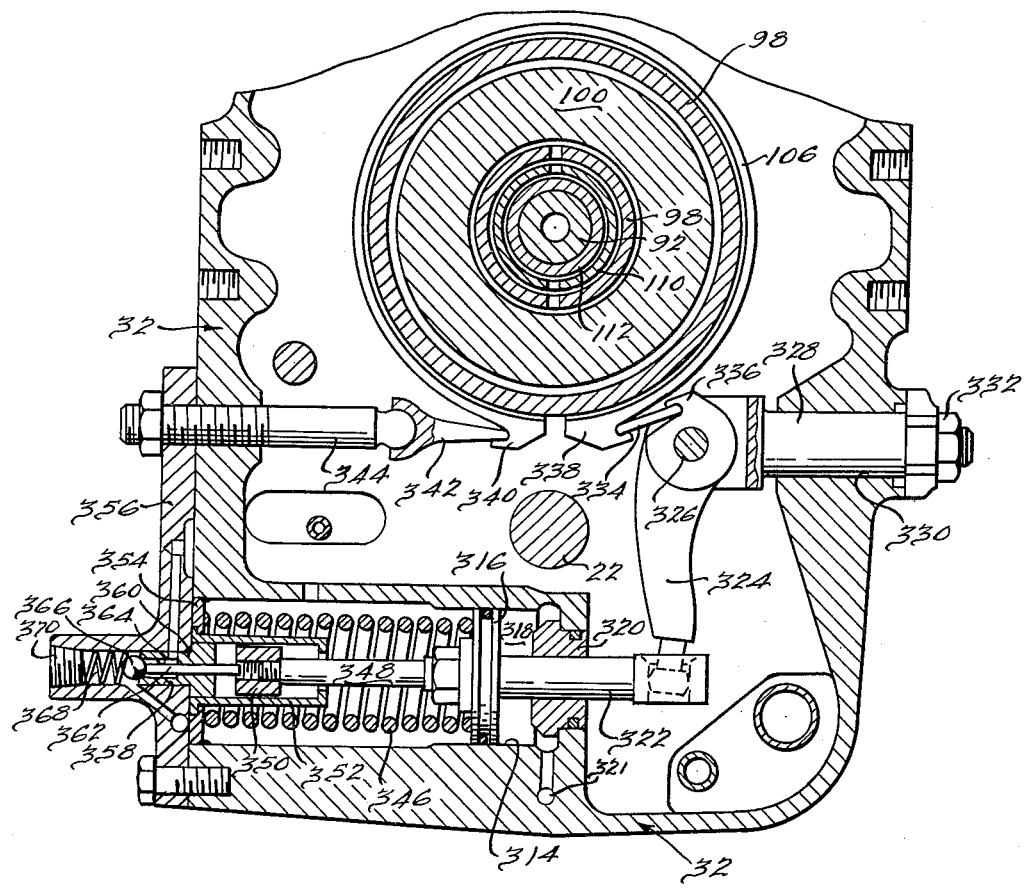

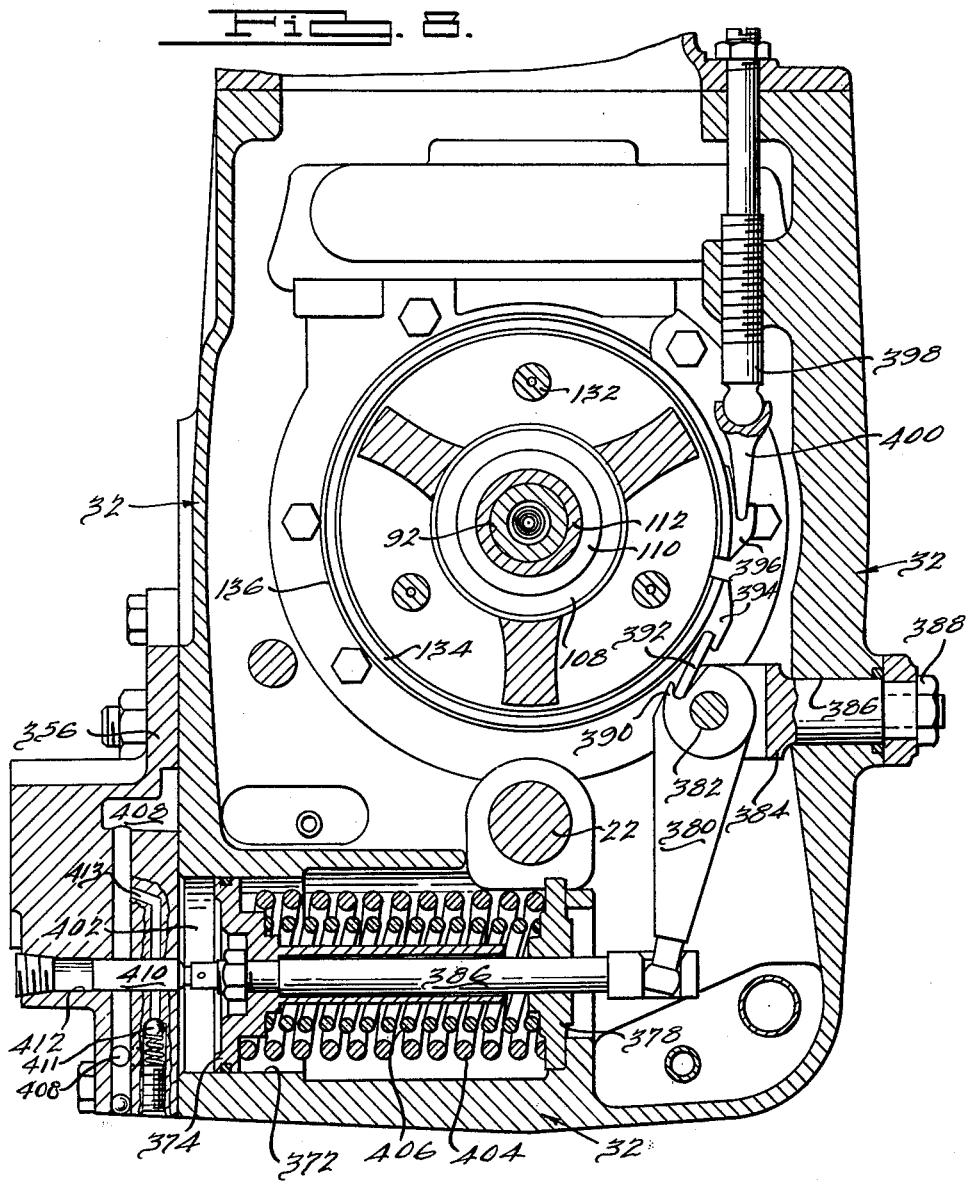

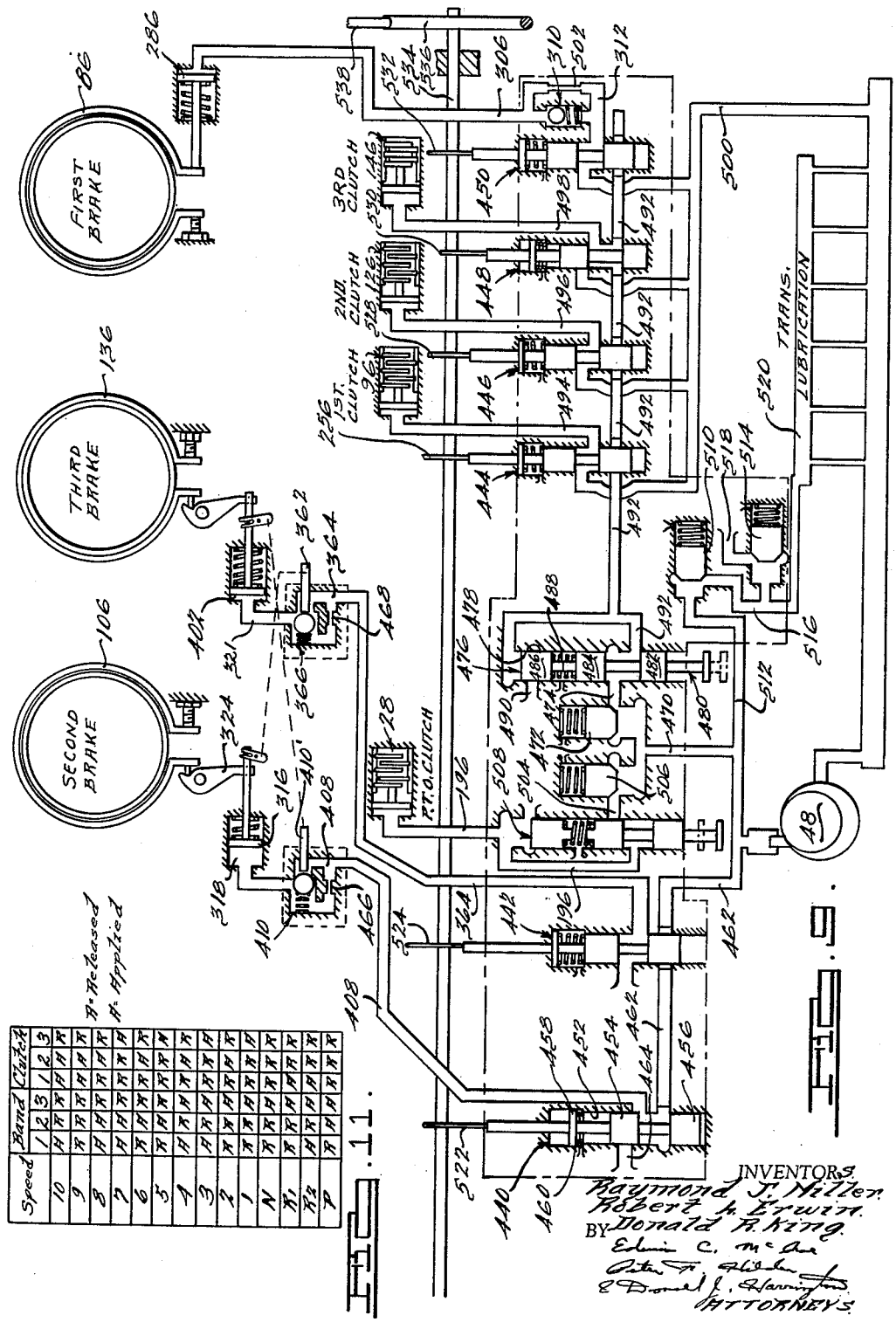

Our invention relates generally to power transmission mechanisms and more particularly to a new and improved multiple speed power transmission mechanism comprising a plurality of co-acting gear units capable of providing power delivery paths between an engine and a driven power shaft with various torque multiplication ratios and wherein provision is made for conveniently selecting any of the ratios during operation to adapt the mechanism for a variety of operating demands.

The transmission mechanism of our instant disclosure is comprised of a plurality of planetary gear units which are adapted to functionally cooperate to provide uniformly stepped speed reduction ratios throughout a relatively large range of magnitudes. Fluid pressure operated clutches and brakes are employed for selectively clutching together the various elements of the planetary gear units and for braking the same in sequence.

Our tansmission mechanism is particularly adapted for use with tractor type vehicles for agricultural purposes although it also may be successfully used with power equipment for industrial applications other than farm tractors. Accordingly, certain specific features of the present embodiment of our invention have been developed and incorporated into the mechanism in order to adapt the same to meet those operating requirements which are of special interest to the farm tractor and implement industry.

Among the features which are of primary importance for farming purposes is a new and improved independent power take-off drive assembly which is drivably connected to the vehicle engine and which is capable of operating at a relatively constant speed. This driving connection is accomplished by means of a two-speed gear train which includes a manually engageable clutch for selectively coupling a high speed gear or a low speed gear of the gear train to the engine driven power input shaft. The multiple gear units of the transmission mechanism and the cooperating control elements make it possible to maintain a substantially constant engine speed during operation and this in turn results in a substantially constant power take-off speed. The power take-off drive assembly makes it possible to utilize either of two engine speeds for any given power take-off speed or to utilize either of two power take-off speeds for any given engine speed, thereby greatly increasing the flexibility of the mechanism.

The provision of an improved power take-off drive assembly with the above features being one of the objects of our instant invention, it is another object to provide an alternative gear train for powering the power take-off drive assembly at speeds proportional to ground speed. This alternative gear train includes interengaged gears connecting the power output shaft to the power take-off drive assembly and a manually engageable clutch for selectively interrupting the transfer of driving torque through these gears. A novel lever mechanism is included within the power take-off assembly for engaging and disengaging the first mentioned manually engageable clutch for the two-speed gear train and the clutch for the alternative gear train. Suitable detent and blocker elements are provided for preventing simultaneous operation of the alternative ground speed interpreting gear train and either the high speed or the low speed driving connection with the power input shaft.

It is another object of our invention to provide a power take-off drive assembly of the type above described which may be applied or released independently of the main power delivery portions of the mechanism and without stopping the engine. It is for this reason that our power take-off drive assembly can properly be described as a completely independent unit and we contemplate that it may be conditioned for power delivery or disengaged from the power source while the transmission is stationary or while the transmission is being shifted from one ratio to another. These characteristics are accomplished in part in our transmission mechanism by means of a fluid pressure operated clutch which forms a part of the above mentioned two-speed gear train and which forms a portion of the power delivery path from the engine to the driven parts of the power take-off drive assembly.

Another object and principal feature of our invention resides in the provision of simplified hydraulic controls for sequentially energizing the various transmission clutches and brakes which regulate the relative motion of the planetary gear elements whereby a smooth transition from one speed ratio to another may be obtained during operation without interupting the delivery of power to the traction wheels. The controls include shift valves, together with a manually operable selector, which distribute the fluid pressure to the fluid pressure operated servos associated with the transmission clutches and brakes so that any given setting of the selector will correspond to a separate transmission speed ratio. It is possible to control the vehicle speed merely by manually adjusting the selector as appropriate, the optimum adjustment depending upon the operating conditions encountered while the engine throttle is maintained at a constant setting. Further, the controls include a feathering valve device for modulating the control pressure made available to the various clutch or brake servos whereby it is possible to effect a cushioned engagement of the transmission clutches or brakes for any given speed ratio. This feathering valve enables the operator to start the vehicle with a controlled degree of smoothness in any of the several gear ratios and it greatly simplifies the task of coupling implements to the tractor. The feathering valve may also be used as a means for quickly interrupting the torque delivery path between the engine and the traction wheels.

It is another object of our invention to provide the transmission controls with a second feathering valve arrangement capable of modulating the pressure made available to the above mentioned fluid pressure operated power take-off clutch thereby permitting the vehicle operator to gradually apply a driving torque to the implement coupled to the power take-off assembly with a controlled degree of smoothness.

According to another object of our invention, we have provided a means for establishing a park condition whereby the traction wheels can be anchored to the transmission casing to prevent roll. The transmission clutches and brakes are appropriately operated to effect this park condition, and the torque delivery path to the traction wheels is thereby interrupted to permit continued operation of the engine. Further, the power take-off assembly may be operated while the transmission is in the park condition. This is of importance when the engine is used as an auxiliary power source since the traction wheels in this instance should be locked.

It is a further object of our invention to provide a control system of the type above described wherein the transmission brakes and clutches include servos which may be applied and released in timed relationship during a shift sequence initiated by movement of the manually operated shift valves and wherein the brakes are engaged prior to the engagement of the cooperating clutch for the particular speed ratio involved.

It is another object and feature of our invention to provide a hydraulic interlock between the fluid pressure operated servos for two of the transmission brakes. In the particular gear arrangement herein described, it is necessary during normal operation for one transmission brake to be released before another is applied since simultaneous engagement thereof would cause a locked up condition. We have therefore provided an interlocking valve mechanism within the transmission controls and have arranged the elements thereof so that they co-act with the movable brake servo elements in such a way that after one brake servo releases its associated band the other applies its associated band. In a similar fashion, the one brake servo is applied after the other brake servo is released.

Further objects and novel features of our invention will become apparent from the following description and from the accompanying drawings wherein:

FIGURE 2 is a partial assembly view of the power take-off portion of the mechanism;

FIGURE 3 is a plan view of the power take-off assembly shown in FIGURE 1;

FIGURE 4 is a cross sectional view of a portion of the power take-off assembly of FIGURES 2 and 3 and is taken along section line 4—4 of FIGURE 3;

FIGURE 5 is an enlarged subassembly view of a right angle drive portion of the power take-off assembly;

FIGURE 6 is a cross sectional view of a first brake adapted to control the relative motion of the elements of the transmission gear units and it shows the fluid pressure operated servos therefor. This figure is taken along section line 6—6 of FIGURE 1;

FIGURE 7 is a cross sectional view of a second control brake for the transmission including a fluid pressure brake servo, and is taken along section line 7—7 of FIGURE 1;

FIGURE 8 is a cross sectional view of another control brake for the transmission mechanism together with the fluid pressure servo therefor, and is taken along section line 8—8 of FIGURE 1;

FIGURE 9 is a schematic representation of the hydraulic controls for the various transmission clutches and brakes;

FIGURE 10 is a cross sectional view of a manually operated selector for adjustably positioning the individual control valves for the circuit of FIGURE 9; and FIGURE 11 is a chart showing the condition of the various clutches and brakes for each speed ratio.

Figure 1:
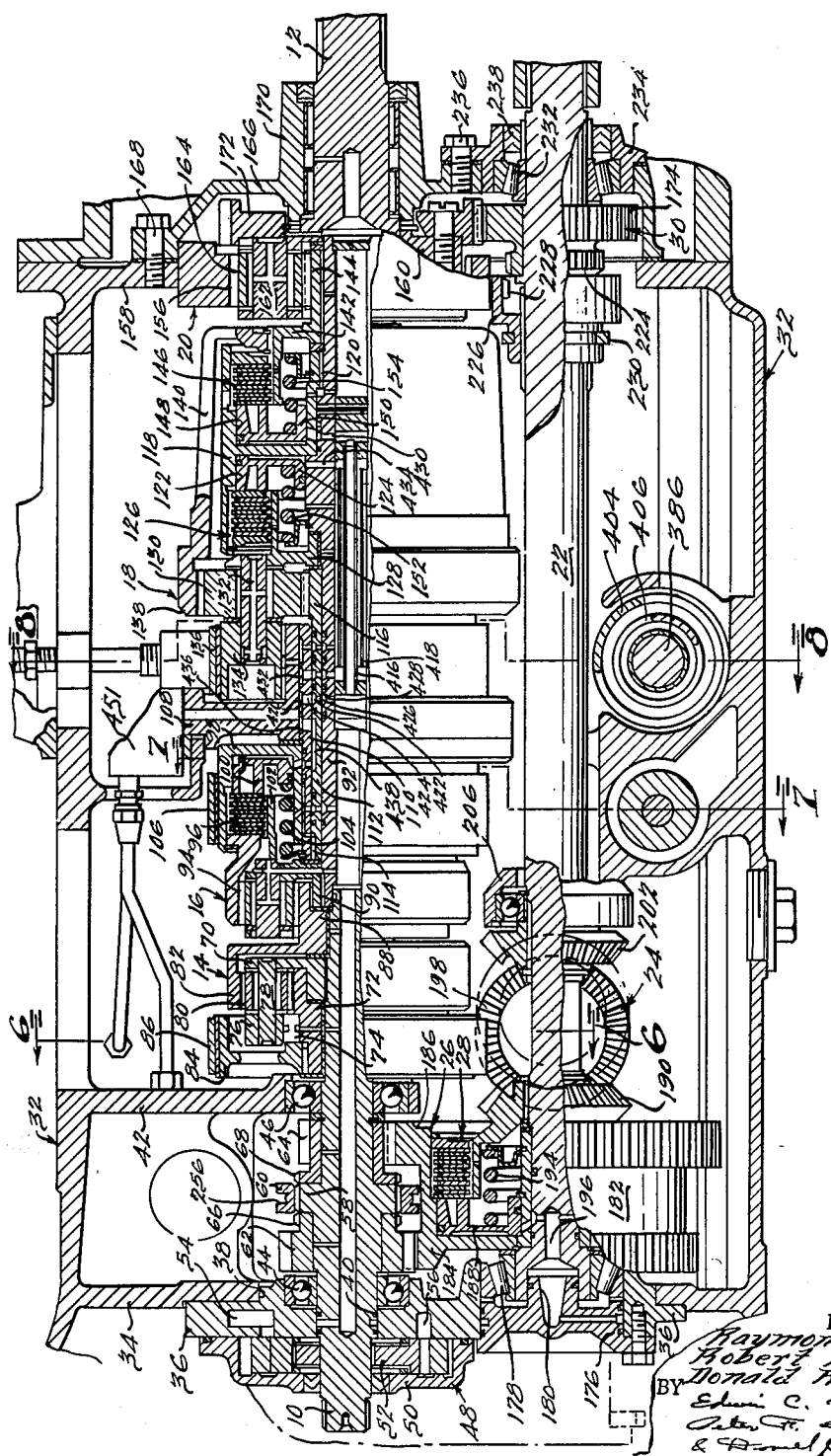
FIGURE 1 is a cross sectional assembly view of the planetary transmission mechanism of our invention.

General Description of Transmission and Power Take-Off Assemblies

Referring first to FIGURE 1, the transmission assembly includes a power input shaft 10 which is drivably connected to the engine crankshaft in a suitable manner and a power output shaft 12 which may be mechanically coupled to the traction wheels. The power input shaft 10 may be drivably coupled to the power output shaft 12 by means of a series of planetary gear units generally identified in FIGURE 1 at 14, 16, 18 and 20, the planetary gear units 16 and 18 being effective to provide five different forward speed ratios and one reverse ratio, and the planetary gear unit 14 providing an overdrive which may be combined with each of the individual ratios obtainable with planetary gear units 16 and 18 thereby doubling the number of ratios which can be obtained by means of the gear units 16 and 18 acting alone. The planetary gear unit 20 simply provides an added speed reduction for all of the ten forward ratios and the two reverse ratios made available by planetary gear units 14, 16 and 18.

The power-take-off shaft is generally designated in FIGURE 1 by numeral 22 and a right angle drive 24 is provided for coupling the shaft 22 to a power take-off cross shaft which will be described in more particular detail in connection with FIGURE 5. The left end of the shaft 22 as viewed in FIGURE 1 is drivably coupled to the engine driven power input shaft 10 through a two-speed gear train generally identified by numeral 26. This gear train includes a fluid pressure operated multiple disc clutch 28 for drivably connecting and disconnecting the shaft 22 from the power input shaft 10. The right end of the shaft 22 as viewed in FIGURE 1 may be connected to the power output shaft 12 through gearing generally designated by numeral 30 to provide a ground speed interpreting source of power for the implements connected to the power-takeoff assembly. Such a compound power take-off coupling means makes it possible for the operator to operate the implements at speeds proportional in magnitude to engine speed or to operate such implements at speeds proportional in magnitude to the ground speed, whichever is desired. If it is desired to reduce or to increase engine speed for constant speed power take-off operation, an appropriate shift in the two-speed gear train may be made in order to maintain an optimum power take-off speed with the engine throttle at an adjusted setting.

Particulad Description of Transmission and Power Take-Off Assemblies

The transmission assembly comprises a transmission casing 32 which includes an end wall 34 to which is secured an adapter plate 36. The adapter plate 36 covers a large diameter opening 38 formed in the wall 34 and is apertured as shown at 40 to receive the power input shaft 10, the latter extending to the exterior of the transmission casing thereby permitting a coupling engagement between the engine crankshaft and the power input elements of the transmission.

The casing 32 is also formed with an internal wall 42 through which the power input shaft 10 extends and a pair of spaced bearings 44 and 46 is situated as shown for rotatably journaling the power input shaft 10 to the adapter plate 36 and to the internal wall 42 respectively.

A positive displacement fluid pump is generally shown in FIGURE 1 at 48 and it comprises a pump casing 50 secured to the outer side of the adapter plate 36 to define a substantially circular pump chamber within which a pump rotor 52 is situated. The rotor 52 is eccentrically positioned with respect to the cooperating pump chamber and carries pumping elements such as slippers or vanes for establishing a control pressure in a pump discharge port 54 formed in the adapter plate 36 as indicated, said port 54 communicating with the pump chamber in a conventional manner. Similarly, the adapter plate 36 is formed with a low pressure inlet port 56 communicating with the pump chamber at a low pressure region. The rotor 52 is positively keyed or splined to the power input shaft 10 and is driven at engine speed during operation. The control pressure thus made available by the pump 48 is utilized for control purposes by the control mechanism which will be described with reference to the FIGURE 9. The pump 48 also acts as a source of lubrication pressure.

The power input shaft 10 has formed thereon at an intermediate location an externally toothed clutch member 58 which is adapted to cooperate with an internally toothed shiftable clutch member 60. A pair of gears with differential pitch diameters is disposed in adjacent relationship with respect to clutch member 58 as indicated at 62 and 64. The gears 62 and 64 are each provided with integrally formed clutch teeth 66 and 68 respectively which are adapted to cooperate with clutch member 60 to selectively connect either of the gears 62 or 64 to the power input shaft 10 as the clutch member 60 is moved in an axial direction. The gears 62 and 64 are adapted to rotate freely on power input shaft 10 whenever the clutch member 60 is out of engagement with the clutch teeth 66 or 68 as appropriate. The gears 62 and 64 form a portion of the power take-off drive assembly which will subsequently be described.

The power input shaft 10 extends into the interior region of the casing 32 and has positively splined thereto a planet gear carrier 70 for the planetary gear unit 14. The sun gear 72 for the planetary gear unit 14 is journaled on power input shaft 10 by means of suitable bushings and it defines an inner race for a one-way clutch 74, the latter forming a one-way driving connection between the inner race of sun gear 72 and an outer clutch race 76 which is a part of the carrier 70. Planet pinions 80 are carried by shafts 78 and are disposed in driving engagement with sun gear 72 and the ring gear 82 of the planetary gear unit 14. A brake drum 84 is keyed or splined to an extended portion of the sun gear 72 and a friction brake band 86 encircles the drum 84 in a conventional manner. Brake band 86 may be operated to selectively anchor brake drum 84 by means of a servo mechanism which will subsequently be described in connection with FIGURE 6.

The sun gear 88 for the planetary gear unit 16 is rotatably journaled by suitable bushings on power input shaft 10 and is positively connected to ring gear 82 of the planetary unit 14. The carrier 90 for the planetary gear unit 16 is positively splined or keyed to an intermediate power delivery shaft 92 which extends axially of the transmission assembly in coaxial relationship with respect to power input shaft 10. The ring gear 94 for the planetary gear unit 16 may be clutched to the carrier 90 by means of the multiple disc clutch assembly shown at 96.

The clutch assembly 96 includes a drum 98 which defines a clutch working cylinder within which an annular piston 100 is slidably disposed. The ring gear 94 is positively coupled to the drum 98 as indicated and alternately spaced clutch discs of the clutch assembly are carried by the drum 98 while the remaining discs are carried by an extension 102 of the carrier 90. A clutch return spring 104 is disposed between the annular piston 100 and a spring back up member secured to the drum 98. A friction brake band 106 encircles the brake drum 98 and is adapted to be selectively applied for anchoring the brake drum 98, and for this purpose we have provided a suitable servo mechanism which will subsequently be described in connection with FIGURE 7.

The casing 32 has secured thereto a support member 108 having a centrally situated opening through which a sleeve shaft 110 is inserted. The shaft 110 rotatably journals the drum 98 by means of suitable bushings and it is formed with a series of grooves and ports forming a part of a fluid pressure system including lubrication pressure passages and control pressure passages. A second sleeve shaft 112 is coaxially journaled within sleeve shaft 110 and it is positively keyed or splined to the drum member 98 as shown at 114. The shaft 112 has further integrally formed thereon the sun gear 116 for the planetary gear unit 18.

The intermediate shaft 92 extends through sleeve shaft 112 and has splined thereto a compound clutch drum 118, the connection therebetween being shown at 120. The clutch drum 118 cooperates with the shaft 92 to define an annular working chamber 122 within which an annular piston 124 is slidably disposed, said piston 124 forming a part of a clutch assembly 126 adapted to drivably connect the clutch drum member 118 to the carrier 128 for the planetary gear unit 18. Planetary pinions 130 are journaled on pinion shafts 132 carried by the carrier 128, the latter including a brake drum 134. A friction brake band 136 encircles the drum 134 and is adapted to anchor the same when it is spring applied by the brake operating servo which will be described subsequently in connection with FIGURE 8. The brake drum 134 may be supported on an axial extension of the support member 108 by suitable bushings.

The ring gear 138 of the planetary gear unit 18 is formed on a torque transfer member 140 which in turn is splined to a radially extending portion 142 of the sun gear 144 for the planetary gear unit 20. This radially extending portion 142 may be clutched to drum 118 by a multiple disc clutch assembly 146. The drum 118 defines a working cylinder 148 within which is slidably positioned an annular piston 150 adapted to apply the multiple disc clutch pack for the clutch assembly 146.

As is readily apparent from an inspection of FIGURE 1, alternate ones of the clutch discs of the clutch assembly 126 are splined to an extension of the carrier 128 for the planetary gear unit 18 and the remaining clutch discs of this clutch assembly are splined to the drum member 118. The piston 124 will urge the clutch discs into frictional driving engagement when fluid pressure is admitted to the right side thereof. A piston return spring 152 is interposed between the piston 124 and an anchor element carried by intermediate torque delivery shaft 92.

Similarly, alternate ones of the clutch discs for the assembly 146 are splined to the above mentioned sun gear portion 142 and the remaining discs of the assembly 146 are splined to the drum 118. The annular piston 150 will apply the clutch pack when fluid pressure is admitted to the left side thereof and it will be retracted by a return spring 154 when the working pressure is exhausted, said spring 154 being disposed between the piston 150 and an anchor member secured to the radially inward part of the drum member 118.

The ring gear 156 of the planetary gear unit 20 is fixed to an end flange 158 of the transmission casing 32 and the carrier 160 of the planetary gear unit 20 is integrally joined to power output shaft 12. The carrier 160 carries planet pinion shafts 162 which have rotatably journaled thereon planet pinions 164 situated in engagement with sun gear 144 and ring gear 156.

An end plate 166 is secured to the flange 158 by bolts 168 and is provided with a bearing support portion 170 in which the power output shaft 12 is rotatably journaled.

The carrier 160 has secured thereto a drive gear 172 which is adapted to drivably engage a second gear 174, said gears 172 and 174 defining in part the gearing 30 which forms an auxiliary drive for the power take-off shaft 22.

The power take-off shaft 22 extends in a longitudinal direction through the transmission casing in parallel relationship with respect to the planetary gear elements previously described. A bearing cap 176 is secured to the plate 36 at the left side of the transmission assembly as viewed in FIGURE 1, and the left end of the power take-off shaft 22 is rotatably journaled in plate 36 by means of a bearing 178. A central portion of the bearing cap 176 is provided with an extension 180 which may be received within an axially extending bore formed in the end of the power take-off shaft 22 to provide oil transfer from the cap 176 to the shaft 22.

The two-speed gear train 26 comprises a gear member 182 having a drum shape which has formed thereon two gears of different pitch diameters as shown at 184 and 186. The gears 184 and 186 respectively mesh with the aforementioned gears 62 and 64 and the gear member 182 defines an annular working cylinder within which an annular piston 188 is disposed. The gear member 182 is journaled on power take-off shaft 22 and a multiple clutch disc assembly is situated within the annular opening in gear member 182 for the purpose of forming a driving connection between gear member 182 and power take-off shaft 22. This is done in the instant embodiment by clutching the gears 184 and 186 to a bevel gear 190, the latter being splined or otherwise positively connected to the power take-off shaft 22. The annular piston 188 may be moved into engagement with the multiple disc clutch pack by means of fluid pressure applied to the left side of the piston 188, a return spring 194 being disposed between the piston 188 and a spring back up member as indicated for retracting the piston 188 to an inoperative position.

Fluid pressure may be admitted to the pressure chamber defined by the annular piston 188 and its cooperating annular cylinder through a pressure passage 196 formed in the shaft 22 and bearing adapter 176. The passage 196 communicates with a peripheral groove in the shaft 22 and with a pressure port formed in the member 182. The multiple disc clutch assembly 28 may thus be applied to establish a driving connection between either one of the gears 62 or 64 and power take-off shaft 22.

Referring next to FIGURE 5, the bevel gear 190 is in driving engagement with a right angle bevel gear 198 fixed on or forming a part of a power take-off cross shaft 200 extending transversely with respect to the center line of the transmission assembly and extending outwardly of the transmission casing so that it may be conveniently coupled to an accessory or implement.

Another bevel gear 202 is splined to power take-off shaft 22 and journaled by bearing 204 in a bearing support 206 defined by the casing 32. The gear 202 engages another right angle bevel gear 208 which is formed on or positively connected to another power take-off cross shaft 210 extending through the exterior of the casing 32 in a direction transverse to the axis of the transmission assembly. Shaft 210 may be suitably journaled by bearings 212 and 214 located in a bearing support 216 which in turn may be secured to the transmission casing 32. The end of the shaft 210 may be suitably splined as indicated at 218 for coupling purposes and a safety cap 220 may be provided as shown to cover the end of the shaft 210 when it is not in use. An oil seal 222 may be located on the shaft 210 within the bearing retainer 216.

As best seen in FIGURE 1, the gear 174 on the right end of the power take-off shaft 22 is formed with a clutch portion having external clutch teeth 224 and a clutch element 226 is keyed or splined to shaft 22 adjacent the clutch teeth 224. The clutch element 226 is adapted to slide axially with respect to shaft 22 and it is formed with internal clutch teeth 228 capable of engaging clutch teeth 24 when it is moved in a right-hand direction as viewed in FIGURE 1. The clutch element 226 may be formed with a peripheral groove in which a shifter fork 230 is disposed, said shifter fork 230 being more fully illustrated in FIGURES 2 and 3.

The right end of the power take-off shaft 22 is journaled by bearing 232 positioned within a bearing retainer member 234 which in turn may be secured to an end plate 166 by bolts 236. An oil seal 238 is provided as shown and the end of the shaft 22 extends outwardly of the transmission casing so that an implement or accessory may be conveniently coupled to an extension shaft which may extend to the rear of the tractor. This is the preferred power take-off arrangement and the power take-off shafts 200 and 210 are merely supplementary in character.

Referring next to FIGURES 2, 3 and 4, the lever mechanism for controlling the gears of the power take-off assembly is shown in a more detailed fashion. A single lever may be used for engaging either the high speed or low speed gear train at the forward end of the transmission assembly or the ground speed interpreting gear train at the rearward end of the transmission assembly, and it includes a manually operable crank or lever 240 carried on a rocker shaft 242, the latter extending through the transmission casing and rotatably journaled thereby. The inner end of the rocker shaft 242 has formed thereon a lever element 244 having an upwardly extending finger and another finger situated on the lower side of the shaft 242. The upper finger of the lever element 244 is adapted to be received within a notch or recess 246 formed in a gear shifter or clutch shaft 248 which extends parallel to the power take-off shaft 22. The shaft 248 may be slidably supported at two or more spaced locations by bosses, such as those shown at 250 and 252, secured to or formed as a part of the transmission casing 32. The forward end of the shaft 248 carries thereon a shifter fork 254 having arms extending to opposite sides of the shiftable clutch member 60. Fingers are carried by the ends of the arms of the shifter fork 254 and these fingers are adapted to engage a peripheral groove 256 formed in the clutch member 60. As best seen in FIGURE 3, a suitable spring loaded detent mechanism 258 is provided for establishing three definite axial positions of the shaft 248. The position shown in FIGURE 3 corresponds to the position assumed by the clutch element 60 as illustrated in FIGURE 1. When the shaft 248 is moved in a right-hand direction, the position established by the detent 258 corresponds to a right-hand position of the clutch element 60 whereby the clutch teeth 68 of the gear 64 become locked to the clutch member 58 of the power input shaft 10. Similarly, the position established by the detent 258 when the shaft 248 is shifted in a left-hand direction as viewed in FIGURE 3 will correspond to a left-hand position of the clutch element 60 whereby the clutch teeth 66 of the gear 62 will be locked to the clutch member 58.

The rocker shaft 242 is biased in a right-hand direction as viewed in FIGURE 4 by a compression spring 260 so that the lever element 244 is normally out of engagement with the notch 246 in the shaft 248. A manual effort must be applied to the lever 240 in order to cause engagement between the lever element 244 and the notch 246.

The previously mentioned shifter fork 230 at the rearward end of the transmission assembly comprises a pair of arms 262 and 264 which carry fingers engageable with a peripheral groove 266 formed in the clutch member 226 and it is slidably supported by a stub shaft 268, the latter being anchored within an opening 270 formed in the stationary flange 158 of the casing 32. A two position detent mechanism may be provided for establishing two operating positions of the shifter fork 230, said detent mechanism being illustrated in FIGURE 4 at 272. Detent grooves are formed in the shaft 268 as indicated in FIGURE 3 and a spring loaded detent ball is urged into engagement in either one or the other of the detent grooves of the shaft 268. The detent ball and its associated spring may be mounted in and carried by the body of the shifter fork 230.

A recess 274 is formed in the shifter fork 230 as illustrated in FIGURE 3 and it is partially covered by an angle bracket or gate member 276 which is disposed in adjacent relationship with respect to the shifter fork 230 and which is secured to the relatively stationary shaft 268, one portion of the bracket 276 being apertured and received over the shaft 268 as indicated at 278 in FIGURE 3. The bracket 276 is formed with a gate opening 280 which is of a sufficient width to permit the lower finger of the lever element 244 to pass therethrough when the lever element 244 is in a position corresponding to the intermediate or neutral position of the clutch member 60 at the forward end of the transmission assembly. This intermediate or neutral position corresponds to the neutral detent position established by detent mechanism 258 and the lever 240 may be shifted manually to the position illustrated in FIGURE 4 by means of dotted lines so that the lower finger of the lever element 244 will pass through the gate opening 280 into engagement with the recess 274. After the lever element 244 has assumed this latter position, the lever element 244 may be rotated about the axis of the shaft 242 to cause a shifting movement of the shifter fork 230 from the position shown in FIGURES 2 and 3 until the teeth 228 of the clutch element 226 mechanically engage the teeth 224 of the drive gear 174. These two operative positions of the clutch member 226 correspond to the two detent positions established by the detent mechanism 272. It will be apparent from an inspection of FIGURE 4 that the lever element 244 will become disengaged from the recess 246 of the shaft 248 whenever it is shifted into engagement with the recess 274 of the shifter fork 230 and it can only be shifted after the shaft 248 has been moved to the neutral position. This lever mechanism and the cooperating interlock feature make it impossible for both clutch members 60 and 226 to be engaged simultaneously.

Referring next to FIGURE 6, we have illustrated the fluid pressure operated servo for applying the forward friction brake band 86 and it comprises a working cylinder 282 defining a cylindrical working chamber 284 within which a circular piston member 286 is slidably positioned. A compression spring 288 is disposed between the piston 286 and the cylinder 282 for normally biasing the latter toward an inoperative position. A piston shaft or plunger 290 extends outwardly of the cylinder 282 and is adapted to apply a tangential braking force to the end 292 of the brake band 86, a suitable force transmitting element 294 being provided for establishing a mechanical connection between the plunger 290 and the brake band end 292. The other end 296 of the brake band 86 may be anchored against an adjustable anchor pin 298 which in turn may be threadably received in a threaded opening 300 suitably located in the transmission casing 32, a locking nut 302 being provided for maintaining the anchor pin 298 in a desired adjusted position.

A closure plate 304 is secured to the cylinder 282 thereby defining a closed fluid pressure chamber behind the piston 286, and a fluid pressure passage 306 is formed in the casing 32 and the cylinder 282 so that it communicates with this pressure chamber thereby providing a means for establishing a fluid pressure braking force. The passage 306 is partly defined by a valve insert 308 located in a cooperating recess in the casing 32 and this insert 308 contains a spring loaded ball check valve 310 for accommodating the passage of fluid pressure from the servo working chamber to a pressure supply conduit 312, the latter being in fluid communication with the passage 306. A bypass passage is provided for bypassing the valve 310, although it is not illustrated in FIGURE 6, and a flow restricting orifice is formed in the bypass passage as will subsequently be explained in the description of the control circuit shown in FIGURE 9.

Referring next to FIGURE 7, we have illustrated the brake servo mechanism for operating the brake band 106 previously described. A working cylinder 314 is formed in an enlarged region of the casing 32 and the circular piston 316 is slidably positioned in the cylinder 314 and defines therewith a working chamber 318, the end of the working chamber being closed by a suitable closure member 320. A fluid pressure passage 321 may be provided as shown for introducing pressure into chamber 318. A piston rod or plunger 322 is secured to piston 316 and extends through the closure member 320, and a brake operating lever 324 is mechanically coupled to the end of the piston rod 322 by a suitable ball and socket type connection. The lever 324 is pivoted at 326 on a bracket 328 secured within a cooperating opening 330 in the casing 32. A locking nut 332 is provided as indicated. A motion transmitting element 334 is disposed between an abutment or shoulder 336 on the lever 324 and one end 338 of the friction brake band 106. The other end 340 of the brake band 106 may be anchored by an anchor element 342 which in turn is carried by an adjustable anchor pin 344 threadably connected to the transmission casing, said pin 344 and anchor element 342 having a ball and socket connection to accommodate a limited degree of angular movement of the latter.

A compression spring 346 is disposed within the cylinder 314 for normally biasing the piston 316 toward a brake applied position. Fluid pressure passages may be formed in the casing 32 surrounding the cylinder 314 for distributing fluid pressure to the working chamber 318 to release the friction brake band 106, the brake operating lever 324 pivoting in a clockwise direction as viewed in FIGURE 7 whenever the fluid pressure in working chamber 318 is sufficient to overcome the compression of spring 346.

The piston 316 has secured thereto a valve operating shaft 348 extending concentrically with respect to spring 346 and it carries a pilot 350 at one end thereof as indicated, said pilot being threadably connected to the end of shaft 248 by a suitable threaded connection. The pilot 350 is slidably retained within an elongated tubular pilot member or guide 352 which in turn is retained against the end wall of the cylinder 314 by a washer 354, the latter being adapted to overlap an end flange on the guide 352. The washer 354 provides a seat for the spring 346.

The end wall of the cylinder 314 is defined by a casing member 356 which is secured to the casing 32 by suitable bolts as indicated. The member 356 is formed with an enlarged portion in which an opening 358 is machined, a circular adapter 360 being fitted in the opening 358. The adapter 360 is formed with a central opening through which a valve stem 362 is slidably received. The stem 362 is adapted to be engaged by the end of the shaft 348 when the piston 316 reaches a leftward brake released position. The adapter 360 defines a portion of a fluid pressure passage as indicated at 364. A ball check valve 366 is located in the opening 358 and it is spring urged into engagement with the adapter 360 to normally close the passage portion 364, a valve spring 368 being provided for this purpose. The portion of the opening 358 within which the spring 368 is contained communicates with passage portion 364 when the ball check valve element 366 becomes unseated and it forms a continuation of the same. The significance of the ball check valve 366 will become apparent from the subsequent description of the control valve circuit and from the schematic control valve circuit drawing of FIGURE 9, the passage portion 364 forming a part of the fluid distribution path for the servo associated with the brake band 136. The end of the opening 358 may be closed by a suitable closure member 370 as indicated.

Referring next to FIGURE 8, we have illustrated the servo mechanism for actuating the brake band 136 and it includes a fluid pressure cylinder 372 formed in a lower part of the transmission casing 32. A piston 374 is slidably positioned in the cylinder 372 and it has a piston rod 376 secured to one side thereof as indicated, said rod being located within an elongated sleeve formed on the piston 374. The rod 376 extends outwardly through the retainer member 378 which in turn is anchored against the casing 32. The rod 376 is operatively connected to the brake actuating lever 380 by means of a ball and socket type connection and the lever 380 is in turn pivoted at 382 on a bracket 384, the latter in turn being retained within an opening 386 in the transmission casing 32 by a suitable locking nut 388.

The lever 380 is formed with a shoulder 390 and a force transmitting element 392 is positioned against the shoulder 390 as indicated. The element 392 acts against one end 394 of the brake band 136 and applies a tangential force to the brake band 136 as the lever 80 is pivoted in a clockwise direction. The other end 396 of the brake band 136 is anchored against a suitable anchor member 398 threadably connected to the transmission casing 32. A wedge member 400 is interposed between the end 396 and the end of the anchor member 398 and a suitable ball and socket type connection between the wedge member 400 and the anchor member 398 is provided to accommodate a limited amount of adjustment of the former. The anchor member 398 may be manually adjusted to any desired position to obtain the desired degree of clearance between the brake band 136 and the associated brake drum 134.

The piston 374 may be urged in a brake releasing direction by fluid pressure which may be admitted to the working chamber 402 defined by the cylinder 372 and the piston 374. Suitable pressure passages not shown in FIGURE 8 are provided for this purpose and will be described with reference to FIGURE 9. A pair of compression springs 404 and 406 are positioned between the piston 374 and the retainer member 378 in concentric relationship about the piston rod 376 for the purpose of normally urging the piston 374 toward a brake operating position. It is contemplated that the brake band 136 will be required to accommodate a torque reaction substantially greater than the torque reaction for the previously described brake band 106 and for this reason two compression springs are deemed to be necessary whereas only a single spring may be used for the brake operating servo for brake band 106. The end of the cylinder 372 is closed by the aforementioned casing member 356 and it is formed with a fluid pressure passage 408 which defines a portion of the fluid pressure path extending to the brake operating servo for brake band 106. A piston extension 410 is carried by the piston 374 and it is slidably received within an opening 412 formed in the casing member 356. The extension 410 forms a valve for selectively interrupting the passage of pressurized fluid through passage 408. The valve 410 provides for a free passage of fluid through passage 408 when the piston assumes a right-hand brake released position, but passage of pressurized fluid from the servo for brake 106 through passage 408 is interrupted when the piston 374 is moved under spring pressure to a brake applied position. When chamber 402 is pressurized the piston 374 is urged to the right-hand or brake released position before valve 410 will allow a free passage of fluid from the servo for brake band 106. The function of the valve 410 will be subsequently explained more fully in connection with FIGURE 9.

In addition to valve 410, we have provided a simple, one-way check valve 411 in a bypass passage 413 as indicated to permit the working chamber 318 of the servo for brake band 106 to become pressurized during a shift to those speed ratios which require the brake band 136 to be applied.

*Operation of Transmission Assembly*

The transmission herein described is capable of providing ten substantially evenly spaced forward driving speed ratios and two reverse speed ratios. The control assembly, which will be described in connection with FIGURE 9, is capable of selectively energizing the various transmission clutches and brakes to condition the transmission for the various operating speeds and it is further capable of permitting the vehicle operator to change from one operating speed ratio to another while the transmission is delivering power to the traction wheels without interrupting the flow of power. For purposes of convenience, the planetary gear unit 14 will be referred to as gear unit A, the planetary gear unit 16 will be referred to as gear unit B, the planetary gear unit 18 will be referred to as gear unit C, the planetary gear unit 20 will be referred to as gear unit D, the clutch assembly 146 will be referred to as the third clutch, the clutch assembly 28 will be referred to as the power take-off clutch, the brake band 86 will be referred to as the "first" brake, the brake band 106 will be referred to as the "second" brake, the brake band 136 will be referred to as the "third" brake, the clutch assembly 96 will be referred to as the "first" clutch and the clutch assembly 126 will be referred to as the "second" clutch. Reference may be made to the chart of FIGURE 11 for a summary of the operating sequences for the various clutches and brakes, the letter "A" indicating an applied condition and the letter "R" indicating a released condition.

To obtain the highest overall gear reduction the third brake and the third clutch are both applied and the remaining brakes and clutches are released. It will also be assumed for our present purposes that the power take-off clutch and the manually operable clutch members 60 and 226 of the power take-off assembly are disengaged. It will therefore be apparent that the engine torque applied to power input shaft 10 will cause the ring gear 82 of the gear unit A to turn at engine speed since the one-way clutch 74 will lock the carrier 70 and the sun gear 72 together for joint rotation. The sun gear of gear unit B is driven at engine speed and the portion of the engine torque applied thereto is divided into two components, one component being carried by the shaft 92 and the applied third clutch to sun gear 144 of gear unit D. The other portion of the power applied to the sun gear of gear unit B will be transferred through the ring gear of gear unit B and into the sun gear of gear unit C thus driving the latter in a reverse direction. Since the carrier of gear unit C is braked, the ring gear of gear unit C will be driven in a forward direction and since the latter is coupled directly to the sun gear of gear unit D, the torque contribution of gear unit C will be added to the torque passing through the previously described power flow path and the resultant torque will be further multiplied by gear unit D. The carrier of gear unit D is joined to the power output shaft 12 as previously described. In one preferred embodiment of the transmission assembly, the overall torque ratio thus obtained will be 37.6:1.

To obtain the second speed ratio the second clutch is applied and the third clutch is released, the third brake remaining applied and the remaining clutches and brakes remaining released. It is thus seen that the carrier for gear unit B is anchored by means of the applied second clutch and the applied brake C, the engine power delivered to the ring gear of gear unit B being transmitted in a reverse direction to the sun gear of gear unit C. Since the carrier of gear unit C is also braked by the third brake band, the ring gear of gear unit C will be driven in a forward direction at an increased torque ratio, and the resultant torque is transmitted to the sun gear of gear unit D and again multiplied by gear unit D. The overall torque ratio obtained during second speed operation is 26.4:1 when the gear dimensions of the aforementioned preferred embodiment are employed.

To obtain third speed operation, the same clutches and brakes are used which were employed for first speed operation except that the first brake is energized. It is thus apparent that an initial overdrive will be obtained in gear unit A since the sun gear thereof is anchored thus causing the associated ring gear to be overspeeded with respect to the power input shaft 10, the one-way clutch 74 being adapted to overrun under these conditions. The overall torque ratio will thus be equal to the product of the overdrive ratio obtained in the input unit and the combined ratio of gear units B, C and D. In the preferred embodiment of the transmission mechanism this overall gear ratio is 24.4:1.

To obtain fourth speed operation the transmission is conditioned in a manner similar to that which was previously described in connection with second gear operation except that the first brake is energized. This produces an overdrive in gear unit A which is combined with the effective gear ratio of gear units B, C and D to produce an overall gear ratio. In the instant preferred embodiment this ratio is 17.1:1.

Fifth speed operation may be obtained by applying the second brake and the third clutch while the remaining clutches and brakes are released. It is thus apparent that the one-way clutch 74 will cause the input gear unit to become locked up thereby causing the sun gear of gear unit B to be driven at engine speed. Since the second brake is applied, the ring gear of gear unit B acts as a reaction member and the carrier of gear unit B will be driven at an increased torque ratio. This carrier torque is transferred through the third clutch to the sun gear of gear unit D, the latter again multiplying the torque to produce an increased combined torque ratio which in our preferred embodiment is 11.2:1.

To obtain sixth speed operation the second clutch is applied and the third clutch is released. The other clutches and brakes will assume the condition previously described in connection with the fifth speed operation; that is, the second brake is applied while the first brake, the third brake, and the first clutch are released. The overrunning clutch 74 will again lock up the input gear unit to permit the sun gear of gear unit B to be driven at engine speed and since the ring gear of gear unit B is anchored by the second brake, the torque acting on the carrier of gear unit B will be transmitted through the second clutch to the carrier of gear unit C. Since the sun gear of gear unit C is anchored, the ring gear of gear unit C will be overspeeded and the resulting torque will be transmitted to the sun gear of gear unit D thus causing the carrier of gear unit D and the power output shaft to be driven. In our preferred embodiment the overall gear ratio for sixth speed operation is 8.7:1.

To obtain seventh speed operation the transmission clutches and brakes may be conditioned in a manner similar to that described in connection with fifth speed operation except that the first brake is applied thus anchoring the sun gear of gear unit A. The ring gear of gear unit A is thus overspeeded and this overdrive ratio is combined with the ratio obtained in the main transmission gear units to produce an overall ratio which is equal to the product of the fifth speed ratio and the overdrive ratio of the gear unit A. In our preferred embodiment this overall torque ratio is 7.2:1.

Eighth speed operation may be obtained by conditioning the transmission clutches and brakes in a manner similar to that previously described in connection with the sixth speed operation except that the first brake is applied to again produce an overdrive in gear unit A. It is thus apparent that the overall torque ratio for eighth speed operation will be equal to the product of the ratio for sixth speed operation and the overdrive ratio of gear unit A. In our preferred embodiment this combined torque ratio is equal to 5.6:1.

To obtain ninth speed operation, the first and second stage gear units are locked up for unitary movement. This is accomplished by applying the first clutch and the second clutch while the second and third brakes and the third clutch are released. The first brake is also released during ninth speed operation and gear unit A thus also assumes a locked up condition by reason of the operation of the one-way clutch 74. It is thus apparent that the sun gear of gear unit D will be driven at engine speed. The overall torque ratio will therefore be equal to the ratio which is obtained by gear unit D acting alone. In our preferred embodiment this ratio is equal to 3.6:1.

Tenth speed operation is obtained by conditioning the transmission clutches and brakes in a manner similar to that previously described in connection wtih ninth speed operation except that the first brake is also applied. This produces an overdrive ratio in gear unit A which is combined with the reduction ratio obtained in gear unit D. In our preferred embodiment the product of these two ratios is 2.4:1.

The first reverse speed may be obtained by applying the first clutch and the third brake while the remaining clutches and brakes are released. Gear unit A assumes a locked up condition by reason of the operation of the one-way clutch 74. The first clutch is effective to lock up gear unit B and it is thus apparent that engine torque will be transmitted directly through gear unit A to drive the sun gear of gear unit C at engine speed. Since the carrier of gear unit C is anchored by the third brake, the ring gear of gear unit C will be driven in a reverse direction and this reverse torque will be multiplied by gear unit D. In our preferred embodiment the overall gear ratio which may be thus obtained is equal to —12.7:1.

A second reverse gear ratio of reduced magnitude may be obtained by applying the first brake so that an overdrive will be obtained in gear unit A to cause the sun gear of gear unit C to be overspeeded with respect to the power input shaft. The ring gear of gear unit C is again driven in a reverse direction and the reverse torque is again multiplied by gear unit C to produce an overall ratio equal to the product of the ratio obtained during operation in the first reverse operating range and the overdrive ratio of gear unit A. In our preferred embodiment this second reverse ratio is equal to —8.2:1.

The transmission assembly is further capable of providing a park condition whereby the traction wheels will be anchored to the transmission casing to prevent roll. This park condition is obtained when the second and third brakes are applied. It is thus seen that the carrier and the sun gear for gear unit C will both be anchored and any torque transferred in a reverse direction from the traction wheels through gear unit D will be transmitted directly from the ring gear of gear unit C to the transmission casing. However, it is emphasized that this park condition will permit the power input shaft to rotate freely without interference since there is no brake member acting on the same. Rotation of the power input shaft will cause gear unit A and the sun gear and carrier of gear unit B to idle freely, and since both the second clutch and the third clutch are released, the idling motion of the first stage carrier is not transmitted to the sun gear of gear unit D or to the carrier of gear unit C. This feature is of considerable importance in the farming industry since it makes possible the operation of implements and various accessories by means of the power take-off assembly while the tractor is in a park condition. The dangers caused by rolling of the tractor during operation of the power take-off are eliminated.

According to another feature of our mechanism, the transmission will automatically assume a park condition after the engine is stopped and provision is made for interrupting the electric starter motor circuit whenever the transmission controls are moved from the park position. This is an added safety feature which will subsequently be more fully described.

*Operation of Power Take-Off Assembly*

To condition the power take-off assembly for operation the clutch element 60 of gear train 26 may be shifted in either a forward or a reverse direction depending upon whether or not a high speed power take-off drive or a low speed power take-off drive is desired. If it is assumed that the operator desires to utilize the low speed power take-off drive of gear train 26, the manually operable lever 240 may be urged in a left-hand direction as viewed in FIGURE 4 against the opposing force of spring 260 until the shifter element 244 engages the recess 246 in the shifter or clutch shaft 248. The vehicle operator may then rotate the lever 240 to cause a rearward shifting movement of the shaft 248 and this in turn will cause a corresponding movement of the shifter fork 254 and the clutch element 60. It is desirable to effect this shift when the vehicle engine is not operating thus eliminating any clashing which might otherwise be caused by the clutching engagement between the clutch element and the clutch teeth 68 of the low speed gear 64. When the vehicle engine is in operation the gear member 182 will rotate about the axis of the power take-off shaft 22 by reason of the positive gear connection thus effected between the same and the power input shaft 10, the relative speeds between the gear member 182 and power input shaft 10 being determined by the relative pitch diameters of the gear 64 and the gear 186. When it is desired to transmit a driving motion to the power take-off shaft 22, the power take-off clutch 28 may be applied by admitting fluid pressure to the working chamber defined by the piston 188 and the associated annular working cylinder, passage 196 being provided for this purpose as previously explained. The control mechanism subsequently to be described includes a feathering valve which is capable of gradually increasing the working pressure behind the piston 188 at a desired and controlled rate to effect a cushioned engagement of the clutch 28. A driven accessory or implement may be drivably connected to the rearward end of shaft 22 or to the cross shafts 200 or 210; and if it is desired to utilize the high speed drive, the lever 240 may be moved into engagement with the recess 246 of the shaft 248 and then rotated to cause a forward movement of the shaft 248 and the shifter fork 254. This effects a clutching engagement of clutch member 60 with clutch teeth 66 of gear 62 to provide a positive driving connection between gear 184 and the power input shaft 10. This shift should be made while the engine is stopped. The power take-off clutch 28 may subsequently be applied and power will thus be supplied to the power take-off shaft 22 and the power take-off cross shafts.

As previously mentioned, this two-speed power take-off drive may be used for powering the power take-off shafts when the vehicle transmission is conditioned for any driving speed ratio or for park or neutral thus greatly increasing the versatility of the tractor. This is possible as previously explained because the transmission elements carried by or connected to the power input shaft are free to idle with the first and second stage brakes applied and with the power output shaft 12 held against rotation.

Under some circumstances it is desirable and sometimes necessary to operate implements used with the farm tractor at speeds which are proportional to ground speed rather than at a constant speed independent of ground speed. Under these circumstances the power take-off clutch 28 is released and the vehicle operator may rotate lever 240 until the lower finger of the shifter member 244 becomes aligned with gate opening 280 of the gate member 276. The angular position of the shifter member 244 at which it becomes so aligned corresponds to the intermediate position of the clutch element 60 of the two-speed gear train at the forward end of the transmission assembly. Having thus attained this neutral position the lever 240 may be shifted until the lower finger of the shifter element 244 becomes engaged with recess 274 of shifter fork 230. When the lever 240 is subsequently rotated, the clutch element 226 is brought into clutching engagement with the clutch teeth 224 of the gear 174 thus establishing a positive geared connection between power output shaft 12 and power take-off shaft 22. It is thus apparent that the gate mechanism and the manually operable lever assembly make it possible to convert the power take-off assembly from a two-speed drive for constant speed operation to a single speed drive for ground speed interpreting operation, and it is impossible to effect a simultaneous engagement of the two-speed drive and the single speed drive. This latter characteristic eliminates the danger of damaging the transmission structure by inadvertent operation of both power take-off gear trains and it contributes to the overall safety and ease in operation.

*Particular Description of the Controls*

Referring next to FIGURE 9, we have provided a rather simplified circuit for sequentially energizing the various transmission clutches and brakes for effecting the above described shifts from one operating speed ratio to another. The controls include the previously mentioned engine driven positive displacement pump 48, and conduit structure is provided for interconnecting the discharge side of the pump 48 with each of the servos for the clutches and brakes. It may be seen from a casual inspection of FIGURE 1 that the conduit structure is defined in part by fluid pressure passages extending to the working chambers for each of the clutch servos and that the passages are strategically positioned so that they communicate with a centralized manifold. For example, concentric pressure conducting tubes are situated within intermediate shaft 92 as indicated at 416 and 418. A control pressure groove 420 is adapted to communicate with a pressure port formed in the support member 108 of the casing 32 and it also communicates with a radially adjacent groove 422 in shaft 112 through port 424, and this groove in turn communicates through port 426 with a radially inward groove 428 in the shaft 92. The shaft 92 is also provided with a port establishing communication between the latter groove and the interior of tube 416. Fluid pressure is then distributed through tube 416 to a radial port 430 at the rearward end thereof and this port in turn communicates with the interior of the working chamber for the third clutch servo. Similarly, control pressure may be distributed from groove 432 in shaft 110 through aligned ports and grooves to the annular passage defined by concentric tubes 416 and 418. This annular passage in turn communicates with a radial passage 434 extending to the interior of the working chamber for the second clutch servo.

Fluid pressure may be distributed to the working chamber for the first clutch servo by means of a control pressure groove 436 situated adjacent groove 420 in shaft 110 and by means of a longitudinal groove 438 in shaft 212 and a communicating radial passage in shaft 110.

Lubricating and cooling oil may also be distributed through the transmission structure to critical regions in a similar fashion.

The circuit illustrated in FIGURE 9 is divided into two portions separated by a pressure regulator valve 472, said valve being adapted to produce different operating pressures in the separate circuit portions during a shift sequence. The second and third brakes are located in one circuit portion and the first brake, the third clutch and the first and second clutches are located in the other circuit portion. Each of the clutches and brakes of the main transmission assembly is controlled by a separate shift valve which either distributes fluid pressure to the associated clutch or brake or exhausts fluid pressure therefrom. These shift valves are identified in FIGURE 9 by numerals 440, 442, 444, 446, 448 and 450, and may be located in a common valve body disposed at a convenient location within the transmission assembly as shown at 451 in FIGURE 1. All of the shift valves are quite similar in construction and in function.

Referring first to valve 440, a valve chamber is provided at 452 and a valve spool is slidably positioned therein as indicated, said valve spool having two valve lands 454 and 456 situated at relatively spaced locations. The valve further includes a spring seat 458 carried at a relatively spaced position within one end of the valve chamber 452. The portions of the valve spool between the seat 458 and the valve land 454 and between the valve lands 454 and 456 may be of reduced diameter as indicated, and a compression spring 460 is interposed between the spring seat 458 and an annular shoulder formed in the valve body within the valve chamber 452. Spring 460 is adapted to normally urge the valve 440 in an outward direction and the portion of the valve chamber in which it is situated is vented through an exhaust port as shown to prevent trapping of oil.

Passage 408, which was previously described in connection with FIGURE 8, is schematically illustrated in FIGURE 9 and it communicates with the valve chamber 452 at a point adjacent valve land 454. Another passage 462 also communicates with the valve chamber 452 at a point adjacent the valve land 456. An exhaust port 464 also communicates with valve chamber 452 at a location which is slightly spaced from the passage 408 and it is adapted to be blocked by valve land 454 when the valve element is moved in a downward direction as viewed in FIGURE 9 against the opposing force of compression spring 460. When the valve element assumes this position communication is established between passage 462 and passage 408 thereby permitting control pressure to pass from the pump 414 and through the valve 440 to the release side of the second brake servo, the working chamber 318 being located on the release side of the servo as previously mentioned in the description of FIGURE 7. The passage 408 extending from valve 440 to the servo working chamber 318 is defined in part by the valve mechanism previously described in connection with the servo structure of FIGURE 8 and it will hereinafter be referred to as the first stage interlock valve. For purposes of convenience, the reference character applied to valve element 410 in FIGURE 8 has been applied to the schematic representation of the first stage interlock valve in FIGURE 9, and the mechanical connection between the movable part of the first stage interlock valve and the second stage servo piston is schematically illustrated at 410'. When the mechanical connection 410' moves the movable valve element of the first stage interlock valve to a passage opening position, free communication is established between passage 408 and the second brake servo working chamber as illustrtaed. When the mechanical connection is moved in the opposite direction the valve element will move to a passage closing position and will prevent the passage of pressurized fluid in a reverse direction from the working chamber 318 to the passage 408. A bypass passage with a flow restricting orifice therein has been provided at 466 to permit the servos to assume an applied condition after the engine has stopped. The flow capacity of this orifice is sufficiently small so that it has a negligible effect on the normal operation of the servos. This feature will be more fully explained in the subsequent description of the operation of the control circuit.

Valve 442 functions in a manner similar to valve 440 and is effective to establish communication between passage 462 and the aforementioned passage 364 extending to the third brake servo. When valve element 442 is moved in an upward direction as viewed in FIGURE 9, communication between passage 462 and passage 364 is interrupted and the latter passage is exhausted through the exhaust port for the valve 442. The passage 364 is defined in part by the valve structure described in connection with FIGURE 7 and this valve structure will hereinafter be referred to as the second stage interlock valve. For purposes of convenience, the symbols used in the schematic representation of FIGURE 9 correspond to the figures used in the description of FIGURE 7 with the reference character 366 designating the composite valve structure. The mechanical connection between the movable valve element of the second stage interlock valve and the piston 316 of the second brake servo is designated by numeral 362 and it also has a counterpart in the structure of FIGURE 7. The second stage interlock valve is capable of preventing the transfer of pressurized fluid from the third brake servo working chamber 402 to the passage 364 when the movable valve element of the second stage interlock valve is in a closed position. A bypass passage with a flow restricting orifice 468 is provided to accommodate the transfer of fluid around the second stage interlock valve, the orifice 468 being similar in function to orifice 466 above described.

The second portion of the control circuit comprises a pressure passage 470 communicating with the discharge side of the pump 48 and extending to a first pressure regulator valve 472, said regulator valve comprising a simple valve element spring loaded in the direction indicated thus tending to close passage 470. When the fluid pressure in passage 470 is sufficient to overcome the force exerted by the regulator valve spring, communication is established between the passage 470 and a passage 474 which in turn communicates with a first feathering valve generally designated by numeral 476.

The feathering valve 476 comprises a valve chamber 478 formed in the valve body and a multiple land valve spool 480 is slidably positioned in valve chamber 478, said spool 480 comprising two spaced valve lands 482 and 484. A movable valve plunger 486 is disposed on one side of the valve spool 480 within the valve chamber 478 and a compression spring 488 is interposed between plunger 486 and valve land 484 to form a resilient connection therebetween. The valve plunger 486 is adapted to close an exhaust port 490 communicating with the valve chamber 478 when it assumes an upward direction as viewed in FIGURE 9. Further, when the valve spool 480 assumes the position shown in FIGURE 9, communication is established between the passage 474 and passage 492. However, when the valve element 480 assumes a downward position, valve land 484 blocks passage 474 thereby interrupting communication between passage 474 and passage 492. The portion of the valve chamber in which spring 488 is situated is vented as shown through a suitable exhaust port to prevent trapping of fluid. The operation of this feathering valve 476 will be set forth in the subsequent description of the operation of the control circuit.

Passage 492 in turn extends to each of the shift valves 444, 446, 448 and 450 and these valves operate in a manner similar to the previously described valve 440 to respectively establish communication between passage 492 and passages 494, 496, 498 and 312, the latter having been referred to in the description of FIGURE 6. Passage 312 communicates with the working chamber for the first brake servo through passage 306 and passages 494, 496, and 498 extend respectively to the first clutch, the second clutch and the third clutch. When the valves 444, 446, 448 and 450 assume an upward position they individually establish communication between their respective servos and their associated exhaust ports which in turn communicate wtih a common sump through a suitable exhaust passage identified schematically in FIGURE 9 by numeral 500. The check valve mechanism associated with the first brake servo previously described in connection with FIGURE 6 is schematically illustrated at 310 in FIGURE 9 and it is capable of preventing the transfer of fluid pressure through the valve opening from passage 312 to passage 306 when it assumes a closed position. A flow restricting bypass passage 502 is situated in parallel relationship with respect to valve 310 thereby providing an impedance to the passage of pressurized fluid into the first brake servo working chamber.

The passage 470 communicates with a passage 504 through a second pressure regulator valve 506, said valve being spring loaded toward a passage closing position as indicated. Passage 504 in turn communicates with a second feathering valve 508 which may be substantially similar in construction to the previously described feathering valve 476. The passage 196, which extends to the working chamber for the power take-off clutch, as previously described in connection with FIGURE 1, also communicates with the feathering valve 508 as indicated.

The valve 508 includes a movable valve spool having two spaced lands for establishing communication between passages 504 and 196 when the valve spool assumes an upward position as viewed in FIGURE 9. However, when it assumes the downward position the passage 504 becomes blocked thereby interrupting communication between passage 504 and the power take-off clutch and venting the latter to the transmission sump.

Valve 508 further includes a movable spring biased valve plunger corresponding to plunger 486 of the valve 476 and it is capable of controlling the degree of communication between passage 196 and the associated exhaust port.

A pressure relief valve 510 is located in a lubricating pressure passage 512 as indicated and it comprises a simple valve plunger spring biased toward a passage closing position. The loading of the spring is such that the relief valve 510 will be opened whenever the pressure in passage 512 exceeds a predetermined value; for example, 200 p.s.i. A lubricating oil pressure regulating valve is shown at 514 and is disposed in series relationship with respect to relief valve 510. Valve 514 is adapted to control the degree of communication between a lubricating oil pressure passage 516 and an associated exhaust port 518, the former extending from the pressure relief valve 510. Passage 516 in turn extends to a lubricating oil pressure manifold 520 from which lubricating and cooling oil passages are supplied. After any given shift sequence has been completed, the pressure in the two circuit portions becomes equalized and the pressure thereafter will be regulated by the valve 510 at a calibrated pressure level.

The individual valves 440, 442, 444, 446, 448 and 450 are each operated by means of separate cams which are schematically designated in FIGURE 9 by numerals 522, 524, 526, 528, 530 and 532 respectively. Each of these cams are carried for simultaneous movement by a cam shaft 534 which may be rotatably journaled on the valve body 451. One end of cam shaft 534 has secured thereto a driving wheel or pulley 536 and an actuating cable 538 encircles the pulley 536 as indicated. The cable 538 serves as a motion transmitting means and may extend to a convenient location adjacent the vehicle instrument panel.

We have illustrated in FIGURE 10 a suitable lever assembly for providing an appropriate movement to the cam shaft 534. This lever assembly comprises a housing 540 which may be flanged as indicated for permitting the same to be conveniently bolted or otherwise secured to an appropriate mounting such as the vehicle dash structure, suitable attaching screw openings being shown at 542, 544 and 546. The housing 520 includes two side walls 548 and 550 having aligned openings 552 and 554 respectively through which a control shaft 556 is received. Shaft 556 extends outwardly from the casing 540 and has secured thereto a disc like member 558, the edge of the member 558 being inwardly flanged as indicated. A recess is formed in member 558 as shown at 560 and a manually operable lever 562 extends through the recess 560 and is formed with a circular opening through which the end of the shaft 556 is received. A bracket 563 is fixed to member 558 and is formed with a recess into which the end of lever 562 is received. It is thus apparent that rotation of the lever 562 about the axis of the shaft 556 will cause movement of the latter. A gate member 564 is fixed to the housing 540 and is formed with gate recesses which cooperate with shaft 562, said recess defining shoulders as indicated at 566 for establishing definite operating positions on the lever 562. Provision may be made for axially adjusting the lever 562 to override the motion inhibiting shoulders of the gate 564.

A second pulley 568 may be keyed to shaft 556 within the housing 640 and it may be enclosed by a cover 570 fixed to the housing 540. The aforementioned cable 538 encircles the pulley 568 as indicated and it may be suitably tensioned to provide a mechanical drive between the lever 562 and the pulley 536 on the cam shaft 534. By preference the cam and pulley arrangement herein described is positive acting. Several commercially available pulley and cable drives of this type are available.

A supporting bracket 572 is secured by suitable bolts to the interior of the housing 540 as indicated and an electric switch 574 may be carried thereon as shown. The switch 574 may form a portion of the engine starter motor relay switch circuit and it is adapted to be closed whenever the lever 562 is moved to the park position. The switch 574 may be actuated by an element 576 carried on an indicator drum 578, the latter being keyed to shaft 556. A spring 580 is interposed between supporting bracket 572 and the indicator drum 578 for the purpose of retaining the carrier in a relatively fixed position with respect to shaft 556.

An electric lamp 582 is carried by supporting bracket 572 and an indicator dial 584 is carried by the drum 578. The housing 540 is formed with a window 586 adjacent the dial 584 and is situated in the line of vision of the vehicle operator. It is thus apparent that when the lever 562 is rotated manually the dial 584 will be moved across the window 586 and the dial will be illuminated by the lamp 582 to indicate the various angular positions of the lever 562. Appropriate indications may be provided on the dial 584. When the lever 562 is rotated toward the park position the element 576 will close the electrical switch 574 to permit the vehicle engine to be started, but the switch 574 is open at all other positions of the lever 562.

*Operation of Control Circuit*

It will be apparent from the foregoing particular description that the various cams for the individual shift valves may be designed to appropriately position the shift valves for any angular position of the control lever 562 so that each angular position of the latter will correspond to a separate transmission speed range. Neutral, park and either of the two reverse speeds may also be selectively obtained by appropriately positioning the control lever 562. For reference purposes, we have provided a chart in FIGURE 9 indicating the various bands and clutches which should be actuated to attain each of the ten forward driving speed ratios, the reverse ratios, neutral and park. For example, during first speed operation the third brake band 136 and the third clutch 146 are applied while the remaining clutches and brakes are released. The cam shaft 536 is thus rotated to a position which will permit cam 532 to shift valve 450 until the valve port is closed and communication is established between passages 492 and 312. Fluid pressure will then be admitted to the apply side of the first brake servo to energize the same. Cam 524 will allow valve 442 to be moved in an upward direction under the influence of the pressure of the associated valve spring to release fluid pressure from the working chamber 402 of the third brake servo, the path followed by the fluid pressure from the working chamber 402 being defined by the interlock valve 366 and passage 364.

After the cam shaft 534 has assumed the position corresponding to first speed operation, the third brake will immediately become energized as above described. However, it is possible to cause a gradual buildup of pressure in passage 292 by means of the feathering valve 476. If it is assumed for purposes of illustration that the valve 476 is moved in a downward direction, valve 484 will block passage 474 and the third clutch 146 will remain released. However, when the valve spool 480 of the feathering valve 476 is manually urged in an upward direction as viewed in FIGURE 9, the passage 474 will become uncovered thereby tending to increase the pressure level of passage 492. An increase in the pressure in passage 492 will be transmitted to the upper side of valve plunger 486 thereby compressing spring 488 and causing the exhaust port 490 to become uncovered. When valve spool 480 continues to be moved against the opposing force of spring 488 a corresponding pressure increase will occur on the upper side of the valve plunger 486 by reason of the increased spring effort of the spring 488. It is thus apparent that exhaust port 490 will become progressively closed as the pressure increases.

The spring 488 conditions the feathering valve so that the rate of pressure buildup in passage 492 is responsive to spring pressure and is independent of flow. It is thus apparent that a gradual transition can be obtained when starting the vehicle merely by adjusting the feathering valve 476 as desired thereby gradually increasing the torque carrying capacity of the associated clutch or clutches. It is possible to interrupt the flow of power through the transmission by moving the feathering valve so that valve land 484 blocks passage 474, and the vehicle may be started from a standing start in any of the several speed ranges simply by manipulating the feathering valve while the transmission selector lever 562 is adjusted to the speed range desired. This greatly simplifies the task of coupling implements to the tractor since it permits inching of the tractor in either a forward or reverse direction.

As previously mentioned, a similar feathering valve is provided for the power take-off clutch and it is similar in operation to valve 476. For example, when the feathering valve 508 is moved to the position shown, the fluid pressure path leading to the power take-off clutch is interrupted and the exhaust port for the feathering valve 508 is fully opened. However, when the valve 508 is adjusted upwardly, as viewed in FIGURE 9, passage 504 becomes uncovered thereby tending to increase the pressure in passage 196. This increased pressure acts upon the valve plunger and depresses the same until the pressure of the valve spring for feathering valve 504 balances the pressure force. When the valve 508 is moved further the spring force of the valve spring is increased, and this results in a new balanced position of the valve plunger whereby the exhaust port for the feathering valve 508 is further restricted. When the exhaust port becomes fully covered, the power take-off clutch pressure will be controlled by valve 510.

It is contemplated that the power take-off feathering valve 508 may be used while the transmission is conditioned for power delivery. Since under some conditions it would be possible to open the circuit to exhaust through the feathering valve 508 it becomes desirable to provide a means for maintaining an adequate pressure in the other parts of the system. This pressure is established in this case by regulator valve 506. The valve spring for valve 506 is designed to maintain a minimum pressure of 165 p.s.i in the control circuit of our preferred embodiment, thereby making certain that the various pressure operated servos remain pressurized regardless of the operating position of the feathering valve 508.

During a shift sequence in which the second brake or the third brake becomes applied and in which one of the clutches is also applied, it is desirably to make certain that the brake band becomes fully applied before the clutch becomes applied since an undesirably rough shift would occur otherwise. For this reason it is desirable to provide a means for pressurizing that portion of the fluid circuit in which the second brake and the third brake are located while the portion of the circuit in which the clutches and the first brake are located is maintained at zero pressure or pressurized with a relatively reduced pressure. For example, during a shift from fourth speed to fifth speed the third brake is changed from an applied condition to a released condition and the second brake changes from a released condition to an applied condition. Simultaneously, the third clutch is changed from a released condition to an applied condition and the second clutch is changed from an applied condition to a released condition. The fluid pressure in the portion of the circuit in which the second and third brakes are situated will in this instance pressurize the working chamber for the third brake servo, and when the third brake approaches a fully released position the associated interlock valve 410 will be moved to a passage opening position by reason of the mechanical connection therebetween. The valve 410 thus immediately provides an exhaust path for the flow of pressurized fluid in the working chamber 318 of the second brake servo thereby immediately applying the second brake band. The rate at which the above action takes place is dependent upon the relative rate of distribution of pressurized fluid to that portion of the circuit in which the brake servos are situated. The valve 472 is effective to cause an accelerated pressure buildup in this circuit portion thereby causing the second or third brake bands to become fully engaged before a corresponding pressure buildup occurs in the other portion of the circuit in which the clutches are situated. In our preferred embodiment, the valve spring for the valve 472 is calibrated so that the valve will be opened only after a pressure buildup of 165 p.s.i. has taken place and this pressure is sufficient to initiate the operation of the second or third stage brake servos. Upon continued pressure buildup beyond the lower limit of 165 p.s.i., the third clutch will become applied in the case of a shift from fourth speed to fifth speed, but this takes place only after the brake bands have been actuated. After the shift interval is completed, the system pressure will rise to that value established by regulator valve 510. During a downshift from fifth speed to fourth speed the reverse sequence takes place and the second brake becomes released while the second clutch becomes applied. In this instance it is desirable to effect a full engagement of the third brake before the second clutch becomes applied. The valve 472 will in this instance cause the second brake servo to become released at an accelerated rate thereby quickly opening the associated interlock valve 366. An exhaust path is thus immediately opened for the working chamber 402 of the third brake servo thereby quickly applying the third brake. After the pressure builds up beyond the minimum limit of 165 p.s.i. as established by the regulator valve 472, the second clutch 126 will be applied, but this occurs only after the second and third stage brakes are actuated.

It is thus apparent that the interlocking valves and the pressure regulator valve 472 cooperate to establish a smooth shift pattern under the conditions above described if the transmission is upshifted from fourth speed to fifth speed or downshifted from fifth speed to fourth speed. They also cooperate to provide a smooth shift in this same fashion when the transmission shift lever is moved from the park condition to any one of the forward driving speed ratios or to the reverse gear ratios.

The first brake servo is situated in the same portion of the circuit in which the clutch servos are located. This is desirable since the first brake is pressure applied rather than spring applied and since it tends to become applied quite rapidly during a shift sequence. To provide a delay in the rate of application of the first brake we have provided the above mentioned restriction 502 interconnecting the passages 312 and 306. The one-way metering valve 310 will operate to cause pressurized fluid to pass through the restriction 502 whenever the first brake band is to be energized but it will permit a rapid discharge of fluid from the first brake servo working chamber when the first brake band is to be released. This delay is deemed to be necessary since gear unit A would otherwise assume an overdrive condition after a shift from one ratio to certain other ratios is initiated and prior to the completion of the shift interval.

As previously mentioned, the interlocking valves 410 and 366 are provided with flow restricting bypasses 466 and 468 respectively. These bypasses are very small orifices or bleed openings which will permit the second brake and the third brake to automatically assume a park condition after the engine has been stopped following operation of the tractor in any of the several drive ranges. It is apparent that the servo springs for the second and third brakes will cause the fluid in the servo working chambers to bleed out the bypasses 466 and 468 after the control circuit has become depressurized, regardless of the position of the shift lever 562. This automatic park characteristic is an added safety feature of our control system.

Having thus described the principal features of a preferred embodiment of our invention, what we claim and desire to secure by U.S. Letters Patent is:

1. A power transmission mechanism comprising a power input shaft, a power output shaft, a pair of planetary gear units forming a power delivery path between said shafts, each planetary gear unit including a sun gear, a ring gear and a planet gear carrier, means for establishing a driving connection between said power input shaft and the sun gear of a first of said pair of gear units, means for establishing a driving connection between the ring gear of the second of said pair of gear units and said power output shaft, a first brake adapted to selectively anchor the sun gear of said second gear unit and the ring gear of said first gear unit, a second brake adapted to selectively anchor the carrier of said second gear unit, first clutch means for drivably connecting the carrier for said first gear unit to said output shaft and second clutch means for connecting both of said carriers together, a power take-off drive shaft, means including a selectively engageable power take-off clutch for drivably coupling said power take-off shaft to said power input shaft, and control means for conjointly applying said brakes and releasing each clutch means to establish a park condition, said power take-off drive shaft being independent of said gear units and operable when said transmission mechanism assumes a park condition.

2. A power transmission mechanism comprising a power input shaft, a power output shaft, a pair of planetary gear units forming a power delivery path between said shafts, each planetary gear unit including a sun gear, a ring gear and a planetary gear carrier, means for establishing a driving connection between said power input shaft and the sun gear of a first of said pair of gear units, means for establishing a driving connection between the ring gear of the second of said pair of gear units and said power output shaft, a first brake adapted to selectively anchor the sun gear of said second gear unit and the ring gear of said first gear unit, a second brake adapted to selectively anchor the carrier of said second gear unit, first fluid pressure operated clutch means for drivably connecting the carrier of said first gear unit to said output shaft and second fluid pressure operated clutch means for connecting both of said carriers together, a power take-off drive shaft, a gear train drivably connecting said power input shaft with said power take-off shaft including a selectively operable fluid pressure actuated clutch, and control means for conjointly applying said brakes and releasing each clutch means to establish a park condition, said power take-off drive shaft being independent of said gear units and operable when said transmission mechanism assumes a park condition.

3. A power transmission mechanism comprising a power input shaft, a power output shaft, a pair of planetary gear units forming a power delivery path between said shafts, each planetary gear unit including a sun gear, a ring gear and a planetary gear carrier, means for establishing a driving connection between said power input shaft and the sun gear of a first of said pair of gear units, means for establishing a driving connection between the ring gear of the second of said pair of gear units and said power output shaft, a first brake adapted to selectively anchor the sun gear of said second gear unit and the ring gear of said first gear unit, a second brake adapted to selectively anchor the carrier of said second gear unit, first fluid pressure operated clutch means for drivably connecting the carrier of said first gear unit to said output shaft and second fluid pressure operated clutch means for connecting both of said carriers together, control means for conjointly applying said brakes and releasing each clutch means to establish a park condition, said power input shaft being permitted to rotate freely with the transmission mechanism in the park condition, a power take-off drive assembly comprising a power take-off shaft, a two-speed gear train drivably connecting said power take-off shaft with said power input shaft, said gear train comprising a high speed gear and a low speed gear, means for mechanically connecting said high speed gear and said low speed gear to said power take-off assembly, and a manually operable mechanical clutch means for selectively and alternately coupling said high speed gear and said low speed gear to said power input shaft.

4. The combination as set forth in claim 3 wherein said power take-off drive assembly further comprises a fluid pressure operated clutch means forming a portion of said two-speed gear train for establishing a positive driving connection between said power take-off shaft and said high speed and low speed gears.

5. A power transmission mechanism comprising a power input shaft, a power output shaft, a pair of planetary gear units forming a power delivery path between said shafts, an independent power take-off drive assembly comprising a power take-off shaft, a first gear train drivably connecting said power output shaft and said power take-off shaft for powering the latter at speeds proportional to ground speed, including a pair of drive gears, a mechanically operable clutch means for selectively coupling one of said pair of drive gears to said power take-off shaft, a second gear train drivably connecting said power input shaft to said power take-off shaft for powering the latter at speeds proportional to engine speed, and a selectively engageable fluid pressure operated clutch forming a part of said second gear train.

6. In a power transmission mechanism comprising a power input shaft, a power output shaft, and a multiple speed gear assembly interconnecting said power input shaft and said power output shaft; a power take-off drive assembly including a power take-off shaft, a two-speed gear drive interconnecting said power input shaft and said power take-off shaft including a high speed gear and a low speed gear, a ground speed interpreting gear drive interconnecting said power output shaft and said power take-off shaft including a drive gear powered by said power output shaft, a first manually operable clutch means for selectively coupling one gear of said two speed drive to said power input shaft, a second manually operable clutch means for selectively coupling said drive gear of said ground speed interpreting drive to said power take-off shaft, and fluid pressure operated power take-off clutch means forming a portion of said two-speed gear drive for alternately connecting and disconnecting said power input shaft and said power take-off shaft.

7. In a power transmission mechanism comprising a power input shaft, a power output shaft, and a multiple speed gear assembly interconnecting said power input shaft and said power output shaft; a power take-off drive assembly including a power take-off shaft, a two-speed gear drive interconnecting said power input shaft and said power take-off shaft including a high speed gear and a low speed gear, a ground speed interpreting gear drive interconnecting said power output shaft and said power take-off shaft including a drive gear powered by said power output shaft, a first manually operable clutch means for selectively coupling one gear of said two speed drive to said power input shaft, a second manually operable clutch means for selectively coupling said drive gear of said ground speed interpreting drive to said power take-off shaft, fluid pressure operated power take-off clutch means forming a portion of said two-speed gear drive for alternately connecting and disconnecting said power input shaft and said power take-off shaft, said first manually operable clutch means including a shiftable clutch member slidably connected to said power input shaft and adapted to selectively engage a portion of said high speed gear and said low speed gear upon movement thereof in one axial direction and in the other axial direction respectively, and means for mechanically shifting said shiftable clutch member.

8. In a power transmission mechanism comprising a power input shaft, a power output shaft, and a multiple speed gear assembly interconnecting said power input shaft and said power output shaft; a power take-off drive assembly including a power take-off shaft, a two-speed gear drive interconnecting said power input shaft and said power take-off shaft including a high speed gear and a low speed gear, a ground speed interpreting gear drive interconnecting said power output shaft and said power take-off shaft including a drive gear powered by said power output shaft, a first manually operable clutch means for selectively coupling one gear of said two speed gear drive to said power input shaft, a second manually operable clutch means for selectively coupling said drive gear of said ground speed interpreting drive to said power take-off shaft, fluid pressure operated power take-off clutch means forming a portion of said two-speed gear drive for alternately connecting and disconnecting said power input shaft and said power take-off shaft, said first clutch means including a first shiftable clutch element slidably connected to said power input shaft and selectively engageable with portions of said high speed gear and said low speed gear upon movement thereof in one axial direction and in the other axial direction respectively, said second manually operable clutch means including a second clutch element slidably carried by said power take-off shaft and engageable with a portion of said drive gear upon movement thereof in one direction, and means for individually actuating each of said clutch elements.

9. The combination as set forth in claim 8 wherein said clutch element actuating means further includes blocker portions adapted to prevent engagement of one clutch element while the other is engaged.

10. In a power transmission mechanism comprising a power input shaft, a power output shaft, and a multiple speed gear assembly interconnecting said power input shaft and said power output shaft; a power take-off drive assembly including a power take-off shaft, a two-speed gear drive interconnecting said power input shaft and said power take-off shaft including a high speed gear and a low speed gear, a ground speed interpreting gear drive interconnecting said power output shaft and said power take-off shaft including a drive gear powered by said power output shaft, a first manually operable clutch means for selectively coupling one gear of said two-speed gear drive to said power input shaft, a second manually operable clutch means for selectively coupling said drive gear of said ground speed interpreting drive to said power take-off shaft, fluid pressure operated power take-off clutch means forming a portion of said two-speed gear drive for alternately connecting and disconnecting said power input shaft and said power take-off shaft, an interlocking motion transmitting means for selectively and alternately operating said first and second clutch means including a manually operated shifter element, and blocker portions adapted to inhibit the operation of one clutch means when the position of said manually operable shaft deviates from an established neutral position for the other clutch means.

11. In a power transmission mechanism, a power input shaft, a power output shaft, planetary gear units interconnecting said shafts to form a torque delivery path therebetween, clutch means for controlling the relative motion of the elements of said planetary gear unit and for defining in part said torque delivery path, two brake means for respectively and alternately anchoring each of two elements of said gear units to condition said gear unit for operation in either of two torque multiplication ratios, said brake means each including actuating servos having a movable actuating piston member, a spring acting on each piston member and adapted to urge the same into an energized position, a fluid pressure chamber defined in part by each of said pistons on one side thereof, separate pressure passages extending to each pressure chamber for accommodating the distribution of working pressure thereto, the fluid pressure force established in each pressure chamber being effective to retract the associated piston to an inoperative position against an opposing spring force, each pressure passage having a one-way valve situated therein and adapted to impede the passage of pressurized fluid from the respective pressure chambers when it assumes a closed position and for accommodating the passage of pressurized fluid in the reverse direction, and a mechanical connection between the piston for one servo and the one-way valve for the other servo whereby the latter is opened as the former is retracted under pressure.

12. In a power transmission mechanism a power input shaft, a power output shaft, a plurality of planetary gear units interconnecting said shafts, a pair of friction brakes adapted to selectively anchor separate elements of said planetary gear units to condition said gear mechanism for either of two speed ratios, a brake operating servo for each brake, each servo including a piston mechanically connected to a separate brake for actuating the same, a spring acting on each piston and adapted to urge the same toward a brake operating position, a separate fluid working chamber defined in part by each piston, a fluid pressure passage communicating with each working chamber, valve means for alternately pressurizing one passage while simultaneously exhausting the other and exhausting said one passage while simultaneously pressurizing the other, separate interlock valve means situated in and partly defining each passage for inhibiting the transfer of pressurized fluid from the respective fluid working chambers while accommodating the transfer of pressurized fluid in the opposite direction, and a mechanical connection between the piston for one servo and the interlock valve means for the other servo, said mechanical connection being adapted to open the interlock valve for one servo when the piston for the other servo is retracted under fluid pressure.

13. In a power transmission mechanism, a power input shaft, a power output shaft, a plurality of planetary gear units interconnecting said shafts, a pair of friction brakes adapted to selectively anchor separate elements of said planetary gear units to condition said mechanism for either of two speed ratios, a brake operating servo for each brake, each brake servo including a piston mechanically connected to a separate brake for actuating the same, a spring for normally urging each piston toward a brake energizing position, a separate fluid working chamber defined in part by each piston, a fluid pressure source, a fluid pressure passage extending from said pressure source to each of said working chambers, valve means situated in and partly defining said pressure passages for alternately pressurizing one passage while simultaneously exhausting the other and for exhausting said one passage while simultaneously pressurizing the other, and a bypass bleed passage means in each pressure passage for accommodating the discharge of fluid pressure from each servo working chamber when the fluid pressure source is ineffective thereby simultaneously anchoring each of said separate elements of said planetary gear units.

14. In a power transmission mechanism having a power input shaft, a power output shaft, planetary gear units interconnecting said shafts to provide a plurality of torque delivery paths of varying torque multiplication ratios, a plurality of pressure operated clutches adapted to control the relative speeds of the elements of said planetary gear units, a pair of friction brakes adapted to selectively and alternately anchor two elements of said gear units in sequence with the operation of said clutches, a fluid pressure source, conduit structure including two regions, one region providing communication between said pressure source and said clutches and the other region providing communication between said pressure source and said brakes, a brake servo associated with each brake for actuating the same, each brake servo including a movable piston operatively connected to its associated brake, spring means for normally urging each piston toward a brake energizing position, each piston defining in part a pressure working chamber for accommodating fluid pressure capable of retracting said pistons against spring pressure to an inoperative position, said other region of the conduit structure including separate passages extending from said pressure source to each working chamber respectively, valve means including first portions for alternately pressurizing one passage while simultaneously exhausting the other and for exhausting said one passage while simultaneously pressurizing the other and including another portion acting in synchronism with said first portions for pressurizing a part of said one region of said conduit structure to energize one of said clutches, and a pressure regulator valve means situated in said conduit structure for establishing a reduced pressure in said one region relative to the pressure in said other region.

15. The combination as set forth in claim 14 wherein said regulator valve means comprises a valve opening formed in a part of said one region, a valve element cooperating with said valve opening and spring means for urging said valve toward said valve opening to interrupt communication between said pressure source and said one region when the operating pressure level of said pressure source is less than a calibrated minimum value, said regulator valve means establishing a pressure differential between said regions during a shift from one torque multiplication ratio to another, the pressures in said regions thereafter being equalized.

16. The combination as set forth in claim 14 wherein each of said separate passages includes an interlock valve partly defining the same, said interlock valves being adapted to inhibit the transfer of pressurized fluid from the respective pressurized fluid working chambers while accommodating the transfer of pressurized fluid in the opposite direction and a mechanical connection between the piston for each servo and the interlock valve for the other servo, said mechanical connections being adapted to open the interlock valve for one servo when the piston for the other servo is retracted under fluid pressure.

17. In a power transmission mechanism, a power input shaft, a power output shaft, multiple element gear units interconnecting said shafts, fluid pressure operated control means for regulating the relative motion of the elements of said gear units to establish various torque multiplication power flow paths through said gear units, a fluid pressure source, conduit structure extending from said pressure source to said control means, said conduit structure including a feathering valve mechanism having a valve chamber disposed in said conduit structure, a personally operable valve spool slidably disposed in said valve chamber including a valve land adapted to block said conduit structure upon movement of said spool in one direction and to open the same upon movement thereof in the opposite direction, a pressure regulator valve member disposed in said valve chamber adjacent said valve spool, an exhaust port communicating with said valve chamber adjacent said valve member, the latter being adapted to restrict said exhaust port upon movement thereof in said other direction, a spring interposed between said valve spool and one side of said valve member and a branch passage forming part of said conduit structure and extending from the downstream side of said feathering valve mechanism to said valve chamber at the other side of said regulator valve member, the fluid pressure in said conduit structure in the region of said control means acting on said valve member in opposition to an opposing force of said spring.

18. In a control system for a fluid pressure operated servo, a fluid pressure source, a fluid pressure passage extending from said pressure source to said servo, and a feathering valve mechanism disposed in and partly defining said passage, said valve mechanism comprising a valve chamber, a personally operable valve member slidably disposed in said valve chamber adapted to block said passage upon movement thereof in one direction and to open said passage upon movement thereof in the opposite direction, a metering valve member disposed in said valve chamber, an exhaust port communicating with said valve chamber adjacent said metering valve member, the latter being adapted to progressively restrict the former when it is moved in said opposite direction, spring means disposed between said personally operable valve member and one side of said metering valve member, and a branch passage communicating with said fluid pressure passage and extending from the downstream side of said feathering valve mechanism to said valve chamber at the other side of said metering valve member, the spring forces acting on said metering valve member balancing the pressure force acting thereon.

19. The combination as set forth in claim 18 wherein said personally operable valve member and said metering valve member include engageable portions adapted to establish positive contact therebetween when the exhaust port is fully closed and wherein a vent passage is formed in the valve chamber in the region of said spring means.

20. In a power transmission mechanism comprising a power input shaft, a power output shaft, and a multiple speed gear assembly interconnecting said power input shaft and said power output shaft; a power take-off drive assembly including a power take-off shaft, a two-speed gear drive interconnecting said power input shaft and said power take-off shaft including a high speed gear and a low speed gear, a personally operable clutch means for selectively coupling one gear of said two-speed drive to said power input shaft, fluid pressure operated clutch means forming a portion of said two-speed gear drive for alternately connecting and disconnecting said power input shaft and said power take-off shaft, said clutch means including a pressure operated servo, a fluid pressure source, conduit structure interconnecting said pressure source and said servo, and personally operable feathering valve means disposed in and partly defining said conduit structure for progressively varying the rate of pressure buildup in said clutch servo.

21. In a multiple speed, power transmission mechanism, a power input shaft, a power output shaft, planetary gear units establishing multiple power flow paths of varying speed ratios between said shafts, clutch and brake means for controlling the relative motion of the elements of said gear units including multiple fluid pressure operated servos, a pressure source, conduit structure including separate portions extending from said pressure source to each servo, each of said separate portions being defined in part by an individual shift valve means for alternately accommodating the distribution of fluid pressure to its associated servo and for blocking the same, a cam shaft, and separate cams carried by said cam shaft in engagement with a movable portion of each shift valve means, said cam shaft being personally operable to appropriately position each shift valve means for any desired shift sequence.

22. In a power transmission mechanism having torque transmitting gear elements, a clutch means for coupling together two of said gear elements and a brake means for anchoring one of said gear elements whereby said mechanism is conditioned for operation with a desired speed ratio, a first servo mechanism for actuating said clutch means and a second servo mechanism for actuating said brake means, each servo mechanism including a fluid pressure movable member, a fluid pressure source, conduit structure interconnecting said servo mechanisms with said pressure source including a shift valve mechanism adapted to alternately interrupt and establish fluid communication therebetween, said conduit structure including two regions, said first servo mechanism being located in one region and said second servo mechanism being located in a second region, and a regulator valve means disposed in said conduit structure for maintaining a lower pressure in one region than in the other during a speed ratio change accompanying actuation of said shift valve mechanism said regulator valve means including a movable valve element adapted to provide controlled fluid communication between said pressure source and said one region.

23. In a control system having friction brake elements and friction clutch elements, separate servo mechanisms for actuating said brake elements and said clutch elements, a fluid pressure source, conduit structure comprising two regions, one region interconnecting said pressure source and a servo mechanism for at least one brake element and the other region interconnecting said pressure source and servo mechanism for said clutch elements, shift valve means defining in part said conduit structure for alternately establishing and blocking fluid communication between said pressure source and said servo mechanisms, and a pressure regulator valve means disposed in said conduit structure for establishing a reduced pressure in said other region relative to the pressure in said one region whereby a desired timing in the operation of each servo is established during a shift sequence said regulator valve means including a movable valve element adapted to provide controlled fluid communication between said pressure source and said one region.

24. In a power transmission mechanism comprising a power input shaft, a power output shaft, and a multiple speed gear assembly interconnecting said power input shaft and said power output shaft; a power take-off shaft, a gear drive interconnecting said power input shaft and said power take-off shaft, fluid pressure operated clutch means forming a portion of said gear drive for alternately connecting and disconnecting said power input shaft and said power take-off shaft, said clutch means including a pressure operated servo, a fluid pressure source, conduit structure interconnecting said pressure source and said servo, and personally operable feathering valve means disposed in and partly defining said conduit structure for progressively varying the rate of pressure build-up in said clutch servo, said valve means comprising a valve chamber, a personally operable valve member slidably disposed in said valve chamber and adapted to block said conduit structure upon movement thereof in one direction and to open said conduit structure upon movement thereof in the opposite direction, a metering valve member disposed in said valve chamber, an exhaust port communicating with said valve chamber adjacent said metering valve member, the latter being adapted to restrict progressively the former when it is moved in said opposite direction, spring means disposed between said personally operable valve member and one side of said metering valve member, and a branch passage communicating with said fluid pressure passage and extending from the downstream side of said feathering valve mechanism to said valve chamber at the other side of said metering valve member, the spring forces acting on said metering valve member balancing the pressure force acting thereon.

25. In a power transmission mechanism comprising a power input shaft, a power output shaft and a multiple speed gear assembly interconnecting said power input shaft and said power output shaft; a power take-off shaft, a power take-off drive assembly including a gear drive interconnecting said power input shaft and said power take-off shaft including a fluid pressure operated clutch mechanism, said clutch mechanism comprising a drum portion rotatably journaled for rotation about the axis of said power take-off shaft, a clutch member disposed within said drum and connected to said power take-off shaft, multiple clutch discs carried by said drum portion and by said clutch member in alternating, adjacent relationship within said drum portion, an annular piston disposed within said drum portion and adjacent said clutch discs and defining in part a fluid pressure chamber within said drum portion, an external gear disposed about the outer periphery of said drum portion, said external gear forming a part of said gear drive, and means for pressurizing said working chamber to condition said power take-off shaft for operation independently of the operation of said multiple speed gear assembly.

26. In a power transmission mechanism comprising a power input shaft, a power output shaft and a multiple speed gear assembly interconnecting said power input shaft and said power output shaft; a power take-off shaft, a power take-off drive assembly including a two-speed gear drive interconnecting said power input shaft and said power take-off shaft including a high speed gear and a low speed gear, a personally operable clutch means for selectively and alternately coupling the gears of said two-speed gear drive to said power input shaft, fluid pressure operated clutch means forming a portion of said two-speed gear drive for alternately connecting and disconnecting said power input shaft and said power take-off shaft, said pressure operated clutch means comprising a drum portion rotatably journaled for rotation about the axis of said power take-off shaft, a clutch member disposed within said drum portion and connected to said power take-off shaft, multiple clutch discs carried by said drum portion and by said clutch member in alternating, adjacent relationship within said drum portion, an annular piston disposed within said drum portion adjacent said clutch discs and defining in part a fluid pressure chamber within said drum portion, two external gears disposed about the outer periphery of said drum portion, each of said external gears drivably engaging a separate one of the aforesaid gears, and means for pressurizing said working chamber to condition said power take-off shaft for operation independently of the operation of said multiple speed gear assembly.

References Cited in the file of this patent

UNITED STATES PATENTS

| | | |
|---|---|---|
| 2,287,279 | Stumpf | June 23, 1942 |
| 2,846,900 | McFarland et al. | Aug. 12, 1958 |
| 2,945,382 | Ritter et al. | July 19, 1960 |